US012798583B2

(12) United States Patent
Ishii

(10) Patent No.: US 12,798,583 B2
(45) Date of Patent: Nov. 17, 2026

(54) VEHICLE CONFIGURED TO MAKE LANE CHANGE CONTROL, AND SERVER APPARATUS

(71) Applicant: SUBARU CORPORATION, Tokyo (JP)

(72) Inventor: Kazuki Ishii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 260 days.

(21) Appl. No.: 18/723,889

(22) PCT Filed: Mar. 31, 2023

(86) PCT No.: PCT/JP2023/013472
§ 371 (c)(1),
(2) Date: Jun. 25, 2024

(87) PCT Pub. No.: WO2024/201972
PCT Pub. Date: Oct. 3, 2024

(65) Prior Publication Data
US 2026/0217250 A1 Jul. 30, 2026

(51) Int. Cl.
*B60W 30/18* (2012.01)
*B60W 50/00* (2006.01)

(52) U.S. Cl.
CPC .. *B60W 30/18163* (2013.01); *B60W 50/0097* (2013.01); *B60W 2520/10* (2013.01); (Continued)

(58) Field of Classification Search
CPC .................... B60W 30/18163; B60W 2552/53
See application file for complete search history.

(56) References Cited

U.S. PATENT DOCUMENTS 9,714,034 B2 7/2017 Otake et al.
9,830,517 B2 11/2017 Madimerou et al.
(Continued)

FOREIGN PATENT DOCUMENTS

JP 2016-172531 B2 9/2016
JP 2017-520056 B2 7/2017
(Continued)

OTHER PUBLICATIONS

International Search Report dated Jun. 13, 2023 from International Application No. PCT/JP2023/013472 filed Mar. 31, 2023, 9 pages.

*Primary Examiner* — Long T Tran
(74) *Attorney, Agent, or Firm* — Rimon P.C.

(57) ABSTRACT

The vehicle includes: a memory that holds map data including information regarding a travel lane and a branch lane; a position generator device configured to generate a current position of the vehicle; and a travel control device configured to control travel of the vehicle by using the current position in the position generator device and the map data in the memory. The travel control device is configured to set a lane change starting point for the lane change control, based on future position prediction of the vehicle. The lane change starting point corresponds to a degree of increase in a lane width of the branch lane. The future position prediction uses the current position and the map data. The travel control device is configured to carry out the lane change control from the travel lane to the branch lane with reference to the lane change starting point.

16 Claims, 12 Drawing Sheets

(52) U.S. Cl.
CPC ..... *B60W 2552/53* (2020.02); *B60W 2556/40* (2020.02); *B60W 2556/50* (2020.02)

(56) References Cited

U.S. PATENT DOCUMENTS

| | | | | |
|---|---|---|---|---|
| 12,181,883 | B2 * | 12/2024 | Matsubara | B60W 30/095 |
| 2009/0157286 | A1 * | 6/2009 | Saito | B60W 30/16<br>701/300 |
| 2017/0137025 | A1 * | 5/2017 | Muto | B60W 30/09 |
| 2017/0248959 | A1 * | 8/2017 | Matsubara | B60W 30/095 |
| 2019/0088137 | A1 * | 3/2019 | Yamada | G08G 1/166 |
| 2019/0106107 | A1 * | 4/2019 | Miura | B60W 30/18154 |
| 2019/0308623 | A1 * | 10/2019 | Sato | B60W 30/12 |
| 2023/0135798 | A1 * | 5/2023 | Matsubara | B60W 30/095<br>701/25 |
| 2023/0303077 | A1 * | 9/2023 | Kato | B60Q 1/346 |
| 2023/0311875 | A1 * | 10/2023 | Nishiguchi | B60W 30/18163<br>701/25 |
| 2023/0311886 | A1 * | 10/2023 | Kato | B60W 10/20<br>701/23 |
| 2023/0311938 | A1 * | 10/2023 | Kato | B60W 30/12<br>701/23 |
| 2023/0316778 | A1 * | 10/2023 | Kato | B60W 10/04<br>701/25 |

FOREIGN PATENT DOCUMENTS

| | | |
|---|---|---|
| JP | 2017-165184 A | 9/2017 |
| JP | 2017-166854 B2 | 9/2017 |

* cited by examiner

VEHICLE CONFIGURED TO MAKE LANE CHANGE CONTROL, AND SERVER APPARATUS

CROSS-REFERENCE TO RELATED APPLICATIONS

This application is the U.S. National Phase under 35 U.S.C. § 371 of International Application No. PCT/JP2023/013472, filed on Mar. 31, 2023.

TECHNICAL FIELD

The invention relates to a vehicle configured to make a lane change control, and a server apparatus.

BACKGROUND ART

As for automobiles, developments of automated driving including driver assistance for occupants have been in progress.

Patent Literatures 1 and 2 disclose a control to allow a vehicle to keep traveling on a lane having branches.

Patent Literature 3 discloses a technique of determining that an automobile has traveled to turn off from a travel lane to a branch lane.

CITATION LIST

Patent Literature

Patent Literature 1: Japanese Unexamined Patent Application Publication (Translation of PCT Application) No. 2017-520056

Patent Literature 2: Japanese Unexamined Patent Application Publication No. 2016-172531

Patent Literature 3: Japanese Unexamined Patent Application Publication No. 2017-166854

SUMMARY OF INVENTION

Problem to be Solved by the Invention

Meanwhile, as described in Patent Literatures 1 to 3, vehicles such as automobiles sometimes travel, on a travel lane, in a segment in which a branch lane is provided. In this case, a vehicle is able to travel on the travel lane by using the techniques in Patent Literatures 1 and 2 and pass through the segment in which the branch lane is provided.

It is desired, however, to make it possible, by automated driving, for a vehicle to not only travel on the travel lane and pass through the segment in which the branch lane is provided, but also turn off from the travel lane to the branch lane.

Thus, what is desired for a vehicle is to make it possible to control a lane change from a travel lane to a branch lane.

Means for Solving the Problem

An aspect of the invention provides a vehicle configured to make a lane change control. The vehicle is configured to control travel involving the lane change control from a travel lane to a branch lane, with respect to the vehicle traveling. The vehicle includes: a memory that holds map data including information regarding the travel lane and the branch lane; a position generator device configured to generate information regarding a current position of the vehicle; and a travel control device configured to control the travel of the vehicle by using the information regarding the current position in the position generator device and the map data in the memory. The travel control device is configured to set a lane change starting point for the lane change control on the travel lane of the vehicle, based on future position prediction of the vehicle. The lane change starting point changes in position, corresponding to a degree of increase in a lane width of the branch lane. The future position prediction uses the information regarding the current position and the map data. The travel control device is configured to carry out the lane change control from the travel lane to the branch lane with reference to the lane change starting point.

An aspect of the invention provides a server apparatus configured to generate travel control information and allow a server communication device to transmit the travel control information to a vehicle traveling. The travel control information is available to the vehicle for a travel control. The server apparatus includes: a server memory that is provided in the vehicle and holds map data including information regarding the travel lane and the branch lane; a position obtainer device configured to acquire information regarding a current position of the vehicle; and a server travel control device configured to generate the travel control information available to the vehicle for the travel control, by using the information regarding the current position to be acquired by the position obtainer device and the map data in the memory. The server travel control device is configured to, when generating the travel control information for a lane change control from a travel lane to a branch lane with respect to the vehicle traveling, generate a lane change starting point for the lane change control with respect to the travel lane of the vehicle, based on future position prediction of the vehicle. The lane change starting point changes in position, corresponding to a degree of increase in a lane width of the branch lane. The future position prediction uses the information regarding the current position of the vehicle traveling and the map data. The server travel control device is configured to allow the server communication device to transmit, as the travel control information, information regarding the lane change starting point or information that allows the vehicle to carry out the lane change control from the travel lane to the branch lane with reference to the lane change starting point.

Effects of the Invention

In the invention, the travel of the vehicle is controlled by using the information regarding the current position of the vehicle and the map data including the information regarding the travel lane and the branch lane. Moreover, in the invention, the lane change starting point for the lane change control is set on the travel lane of the vehicle, based on the future position prediction of the vehicle. The lane change starting point corresponds to the degree of increase in the lane width of the branch lane. The future position prediction uses the information regarding the current position and the map data. Moreover, the travel control device carries out lane change control from the travel lane to the branch lane with reference to the lane change starting point.

This makes it possible for the vehicle traveling under the control of the invention to control the travel involving the lane change control from the travel lane to the branch lane.

In particular, in the invention, for example, not a branch starting point of the branch lane that branches off from the travel lane, but the lane change starting point corresponding to the degree of increase in the lane width of the branch lane serves as the reference. Moreover, in the invention, the lane change control from the travel lane to the branch lane is carried out with reference to the lane change starting point that changes in position, corresponding to the degree of increase in the lane width of the branch lane. This makes it possible to allow the vehicle traveling under the control of the invention to travel, while inhibiting the vehicle traveling under the control of the invention from excessively approaching a lane edge or a lane borderline on opposite side of the branch lane to the travel lane.

In contrast, in a case where the lane change control is carried out with reference to, for example, the branch starting point of the branch lane, when the lane width of the branch lane is small just ahead from the branch starting point, the vehicle easily approaches the lane edge or the lane borderline on the opposite side of the branch lane to the travel lane. In the invention, it is possible to inhibit occurrence of such approach.

MODES FOR CARRYING OUT THE INVENTION

In the following, some embodiments of the invention are described with reference to the drawings.

First Embodiment

Figure 1:
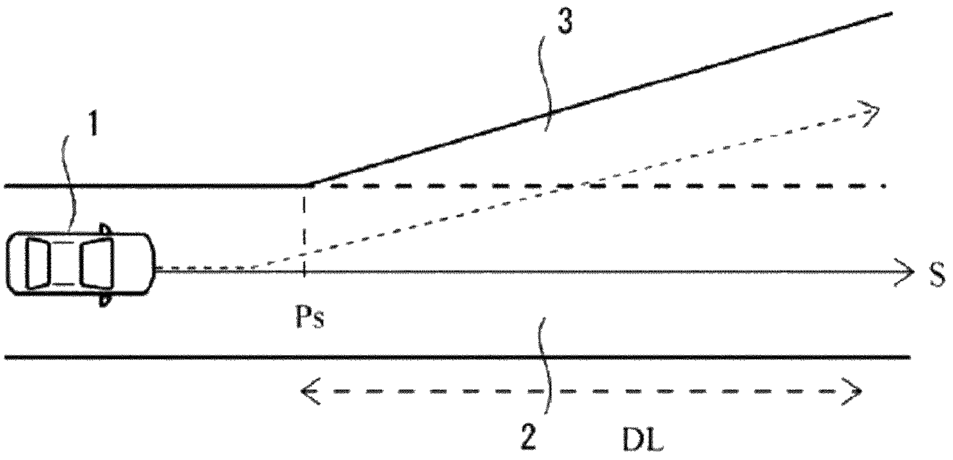
FIG. 1 is an illustrative diagram of an example of a travel state of an automobile according to a first embodiment of the invention.

FIG. 1 is an illustrative diagram of an example of a travel state of an automobile 1 according to a first embodiment of the invention.

In FIG. 1, the automobile 1 is traveling on a travel lane 2 of a road on which the automobile 1 is traveling, toward a branch segment DL in which a branch lane 3 is coupled to the travel lane 2. Such a branch lane 3 is provided at, for example, an exit ramp on a highway or an entrance into a service area on a highway.

Here, when the automobile 1 travels by automated driving including driver assistance, a travel control device 11 described later of the automobile 1 controls travel of the subject automobile based on a current position of the subject automobile and information regarding the travel lane 2 and the branch lane 3 held in high-precision map data 17.

For example, when allowing the automobile 1 to travel on the travel lane 2 to pass through the branch segment DL, the travel control device 11 controls the travel of the subject automobile to travel while keeping to the travel lane 2 by using path information S regarding the travel lane 2 held in the high-precision map data 17. Basically, the path information S may be information represented by a line segment indicating the middle of a lane width of a lane to which it corresponds, as indicated by an arrowed solid line in the figure. In this case, a position in the path information S indicates a unique position on the lane to which it corresponds.

In contrast, when allowing the automobile 1 to travel from the travel lane 2 toward the branch lane 3, the travel control device 11 controls the travel of the subject automobile to make a lane change from the travel lane 2 to the branch lane 3 by using the path information S regarding the travel lane 2 and the information regarding the branch lane 3 held in the high-precision map data 17.

In FIG. 1, a course when the automobile 1 is allowed to travel from the travel lane 2 toward the branch lane 3 is indicated by a broken line. Here, when the current position of the subject automobile approaches a branch starting point Ps at which the branch lane 3 branches off from the travel lane 2, the travel control device 11 starts the lane change control from the travel lane 2 to the branch lane 3 before arrival at the branch starting point Ps. The branch starting point Ps is held in the high-precision map data 17. In this case, the automobile 1 whose travel is controlled by the automated driving is configured to start entering the branch lane 3 immediately after passing the branch starting point Ps of the branch lane 3. The automobile 1 is configured to travel to move smoothly from the travel lane 2 toward the branch lane 3.

It is to be noted that, in FIG. 1, the path information S is information corresponding to the straight travel lane 2, and therefore, is represented by a straight arrow. Sometimes, the road on which the automobile 1 travels is curved. In this case, the path information S may be curved along the curved lane. In this case, it suffices to linearly expand the curved path information S. By using the information obtained by expanding the curved path into the linear path, the travel control device 11 is configured to travel, for example, from the curved travel lane 2 toward the curved branch lane 3 by the lane change control with reference to the branch starting point Ps of the branch lane 3.

By such a lane change control by the travel control device 11, the automobile 1 is configured to travel from the travel lane 2 toward the branch lane 3.

Figure 2:
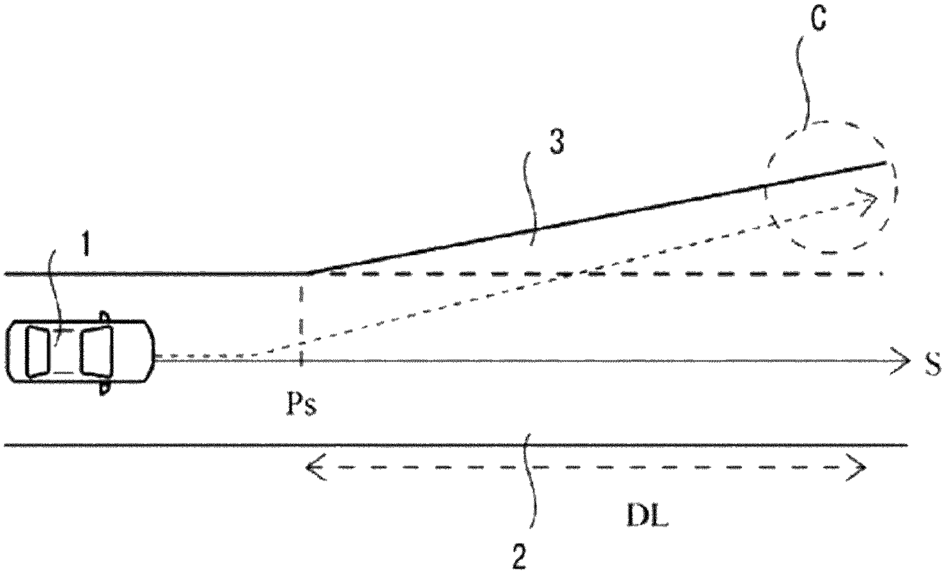
FIG. 2 is an illustrative diagram of another example of the travel state of the automobile in FIG. 1.

FIG. 2 is an illustrative diagram of another example of the travel state of the automobile 1 in FIG. 1.

In FIG. 2, as with FIG. 1, the travel control device 11 of the automobile 1 starts the lane change control to travel from the travel lane 2 toward the branch lane 3 before the arrival at the branch starting point Ps with reference to the branch starting point Ps of the branch lane 3. Thus, the automobile 1 travels to move from the travel lane 2 toward the branch lane 3 along a course indicated by a broken line in FIG. 2.

However, expansion of the lane width of the branch lane 3 in FIG. 2 is smaller than that of the branch lane 3 in FIG. 1. The lane width of the branch lane 3 is smaller than a vehicle width of the automobile 1 even if the automobile 1 advances in the branch segment DL for a while to move away from the branch starting point Ps. As a result, as indicated by a circle C in a broken line in the figure, the automobile 1 approaches an edge of the branch lane 3 after entry into the branch lane 3. Such travel to approach the edge of the branch lane 3 causes possibility that an occupant of the automobile 1 may feel anxious about the travel under the lane change control toward the branch lane 3 by the automated driving. At an exit ramp on a highway or an entrance into a service area on a highway, the lane width of the branch lane 3 is limited by terrain in which they are provided, resulting in possibility that the expansion of the lane width of the branch lane 3 becomes small, as illustrated in FIG. 2.

As described, in the lane change control from the travel lane 2 to the branch lane 3 by the automated driving, simply making it possible to carry out the lane change control does not suffice, as in a case where a lane change is controlled by avoiding other vehicles between multiple lanes arranged side by side on one road. Thus, further improvement is desired.

Figure 3:
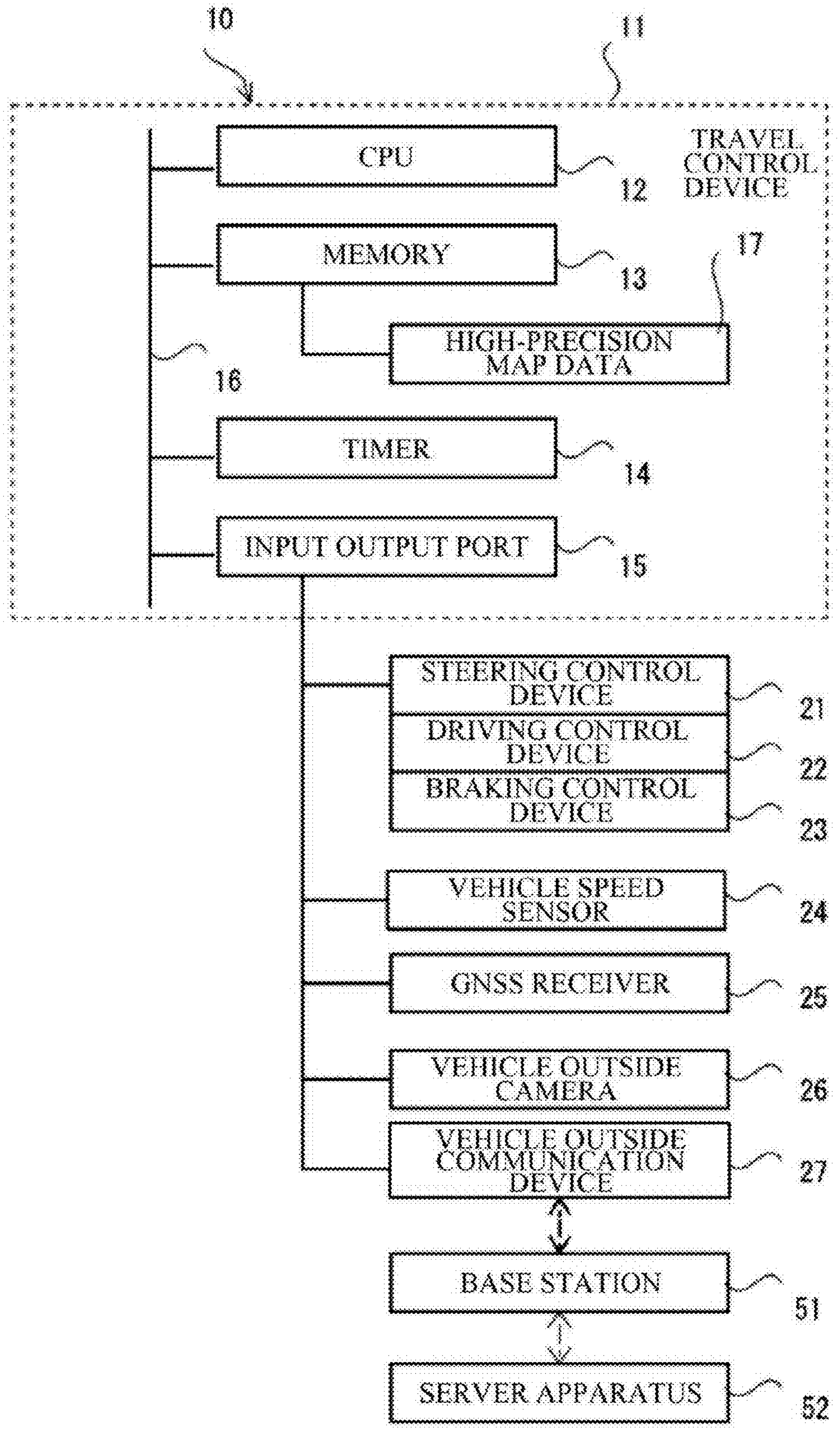
FIG. 3 is an illustrative diagram of a main part of a control system provided in the automobile in FIG. 1.

FIG. 3 is an illustrative diagram of a main part of a control system 10 provided in the automobile 1 in FIG. 1.

FIG. 3 illustrates the travel control device 11 in the control system 10 of the automobile 1. The travel control device 11 includes a CPU (Central Processing Unit) 12, a memory 13, a timer 14, an input output port 15, and an internal bus 16 to which these are coupled.

Moreover, a steering control device 21, a driving control device 22, a braking control device 23, a vehicle speed sensor 24, a GNSS (Global Navigation Satellite System) receiver 25, a vehicle outside camera 26, and a vehicle outside communication device 27 are coupled to the input output port 15.

It is to be noted that the control system 10 of the automobile 1 basically has a structure in which multiple control devices are coupled to a vehicle network using a harness or the like. The vehicle network may be, for example, a vehicle network compliant with standards such as the CAN (Controller Area Network) and the LIN (Local Interconnect Network). In this case, the various devices to be coupled to the input output port 15 described above may be directly coupled to the vehicle network or may be directly coupled to another control device coupled to the vehicle network. Moreover, the steering control device 21 is configured to exchange information with the various devices described above by coupling an unillustrated in-vehicle communication device to the vehicle network instead of the input output port 15 or together with the input output port 15. It follows that FIG. 3 illustrates a main part of the control system 10 actually provided in the automobile 1 in a simplified manner.

For example, the steering control device 21 controls a direction of steered wheels provided in the automobile 1 based on a control value for steering based on a steering wheel angle of a steering wheel to be operated by a driver of the automobile 1. This makes it possible to control a direction of advance of the automobile 1 in a straight direction, a right direction, a left direction, or the like.

For example, the driving control device 22 controls a driving force source and a power transmission mechanism provided in the automobile 1 based on a control value for driving based on an amount of operation of an accelerator pedal to be operated by the driver of the automobile 1. This may cause acceleration of a speed of the automobile 1.

For example, the braking control device 23 controls a braking device provided in the automobile 1 based on a control value for braking based on an amount of operation of a brake pedal to be operated by the driver of the automobile 1. This may cause deceleration of the speed of the automobile 1. When the speed of the automobile 1 becomes 0 km/h by the deceleration, the automobile 1 stops.

With the steering control device 21, the driving control device 22, and the braking control device 23, the automobile 1 is configured to travel on a road under a travel control of the driver or the like.

The vehicle speed sensor 24 detects the current speed of the automobile 1. As the vehicle speed sensor 24, not only a speed sensor but also an acceleration rate sensor may be used. It is possible to obtain the speed by time-integrating the acceleration rate detected by the acceleration rate sensor. Moreover, in the embodiment, as the speed of the automobile 1, the speed sensor may be configured to detect not only a speed component in a longitudinal direction of the automobile 1 but also a speed component in a vehicle widthwise direction of the automobile 1.

The GNSS receiver 25 receives radio waves of GNSS satellites launched into a satellite orbit of the earth, and generates information regarding the current position and the current time of the automobile 1 in which the GNSS receiver 25 is provided.

The GNSS receiver 25 is a position generator device that is provided in the automobile 1 and repetitively generates the information regarding the current position, in the automobile 1 traveling.

The vehicle outside camera 26 captures an image of the surroundings, i.e., the outside of the automobile 1. In particular, the vehicle outside camera 26 captures a frontward image of the automobile 1. As the vehicle outside camera 26, a camera configured to capture an image in a direction of a predetermined angle of view from the automobile 1 or a camera configured to capture a 360-degree image of the entire surroundings of the automobile 1 may be used. Moreover, the automobile 1 may include multiple cameras. The multiple cameras to be provided in the automobile 1 may have their angles of view and parallax defined. The two cameras having the parallax defined are configured to calculate a relative distance and a relative direction from the automobile 1 to a vehicle outside object imaged commonly by the two cameras. Moreover, even a so-called monocular camera is configured to obtain the relative distance and the relative direction from the automobile 1 on a virtual road surface based on an imaging position in a captured image by the monocular camera.

The vehicle outside communication device 27 establishes a wireless communication path with a base station 51 provided on a road or the like on which the automobile 1 travels. The base station 51 includes, for example, one for the ADAS (Advanced Driver Assistance Systems), one for a carrier communication network, and the like. Moreover, in the automated driving of the automobile 1, it is assumed that a base station for 5G communication or the like is mainly used.

Furthermore, when the base station 51 with which communication is available is present, the vehicle outside communication device 27 is configured to transmit and receive information to and from a server apparatus 52 coupled to the carrier communication network or the Internet by using the wireless communication path established with the base station 51. The travel control device 11 is configured to transmit and receive information to and from the server apparatus 52 by using the vehicle outside communication device 27.

The timer 14 measures the time or time.

The memory 13 holds a program to be executed by the CPU 12 and various kinds of information to be used by the CPU 12 during the execution of the program. FIG. 3 illustrates the high-precision map data 17 as the information to be held in the memory 13. The memory 13 may be, for example, a combination of a volatile memory such as a RAM (Random Access Memory) and a nonvolatile one such as ROM (Read Only Memory) or an HDD (Hard Disk Device).

The high-precision map data 17 includes information regarding roads on which the automobile 1 travels. In particular, the high-precision map data 17 prepared as a base for the automated driving includes the path information S regarding each travel lane on which the automobile 1 can travel, and lane width information. The high-precision map data 17 includes information regarding a lane width of the travel lane 2 in FIG. 1 and information regarding the lane width of the branch lane 3. Moreover, as for the branch lane 3, the high-precision map data 17 includes information regarding the branch starting point Ps.

As described, the memory 13 holds the high-precision map data 17 including the information regarding the travel lane 2 and the branch lane 3.

Figure 4:
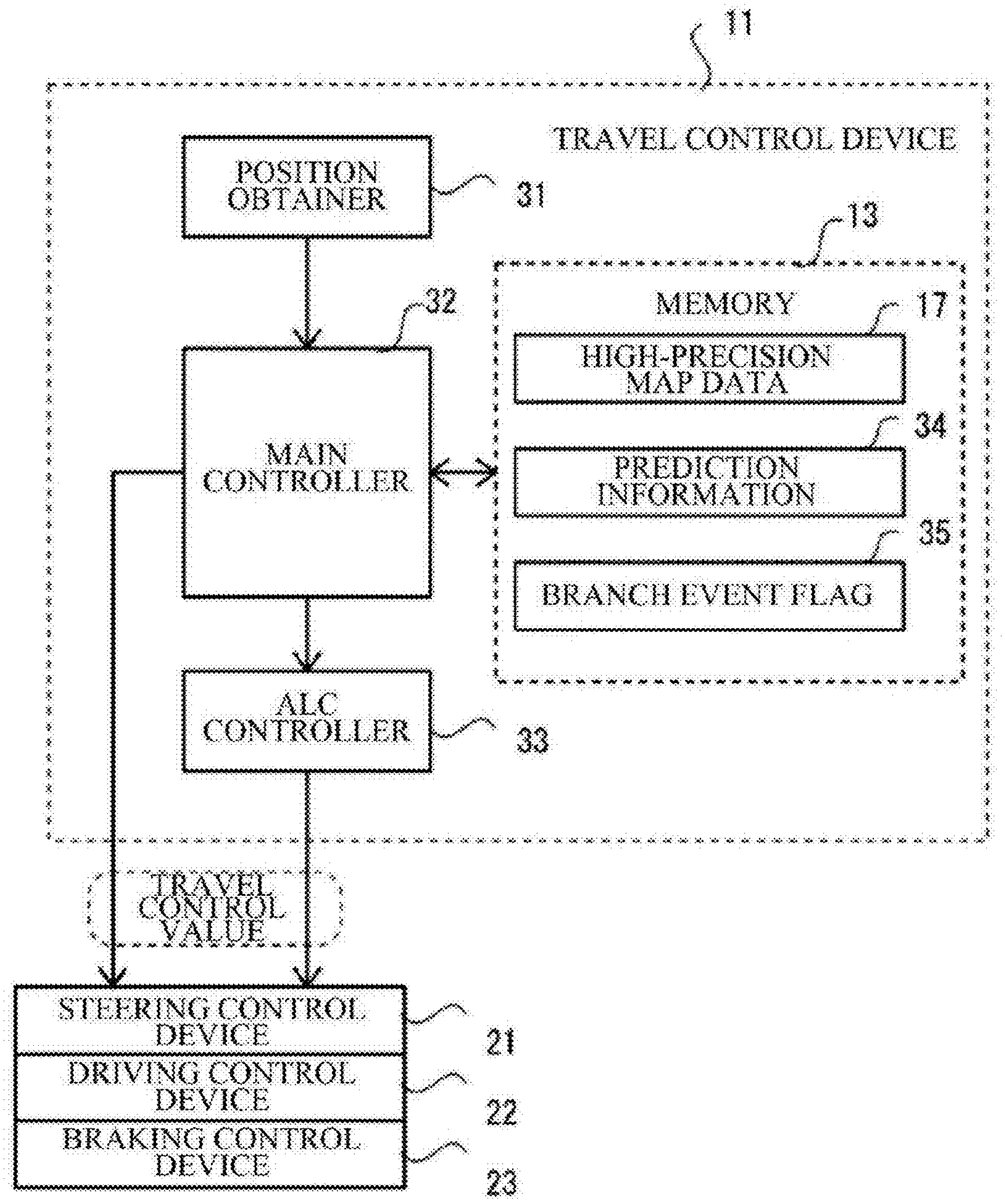
FIG. 4 is an illustrative diagram of a configuration of a main part for a lane change control, to be realized by the control system of the automobile in FIG. 3.

The CPU 12 reads and executes the program held in the memory 13. Thus, a controller is realized in the travel control device 11. The controller may include multiple modules that control the travel of the automobile 1. For example, FIG. 4 illustrates a position obtainer 31, a main controller 32, and an ALC (adaptive lane control) controller 33 as the modules to be realized in the travel control device 11 by the CPU 12. In the embodiment, the CPU 12 carries out a travel control of the automobile 1 traveling, by a combination of the position obtainer 31, the main controller 32, and the ALC controller 33. The travel control of the automobile 1 involves the lane change control from the travel lane 2 to the branch lane 3.

FIG. 4 is an illustrative diagram of a configuration of a main part for the lane change control, to be realized in the control system 10 of the automobile 1 in FIG. 3.

FIG. 4 illustrates the travel control device 11, the steering control device 21, the driving control device 22, and the braking control device 23. The travel control device 11 controls the travel of the automobile 1 by the automated driving. The steering control device 21, the driving control device 22, and the braking control device 23 are supplied with a travel control value to be generated by the travel control device 11 for the automated driving.

Moreover, the travel control device 11 includes the memory 13, the position obtainer 31, the main controller 32, and the ALC controller 33. The memory 13 holds the high-precision map data 17, prediction information 34, and a branch event flag 35. The prediction information 34 and the branch event flag 35 are information to be dynamically updated in the memory 13 by the CPU 12 in a process as the main controller 32. The prediction information 34 is the prediction information 34 regarding a future position of the automobile 1. The branch event flag 35 is set when the automobile 1 travels from the travel lane 2 toward the branch lane 3.

The position obtainer 31 acquires the latest current position of the automobile 1 from the GNSS receiver 25. It is to be noted that the position obtainer 31 may correct the current position and the current time of the automobile 1 acquired from the GNSS receiver 25 by using, for example, information regarding the base station 51 with which communication is available to the vehicle outside communication device 27, and information regarding a state of receipt of public radio waves. The current position acquirable by the automobile 1 may have error accuracy of several tens of centimeters at the highest accuracy.

The ALC controller 33 basically generates the travel control value that allows the automobile 1 to travel while keeping to the travel lane 2, and outputs the travel control value to the steering control device 21. The ALC controller 33 may generate and output the travel control value to the driving control device 22 and the braking control device 23.

For example, when it can be determined that the position in the vehicle widthwise direction of the automobile 1 on the travel lane 2 is not located at the middle of the lane width of the travel lane 2 based on the positions of the left and right lane borderlines of the travel lane 2 in the captured image by the vehicle outside camera 26, the ALC controller 33 generates the travel control value for the steering and outputs the travel control value to the steering control device 21. The travel control value for the steering restores the position in the vehicle widthwise direction of the automobile 1 to the middle of the lane width of the travel lane 2. It is to be noted that the ALC controller 33 may determine whether or not the position in the vehicle widthwise direction of the automobile 1 is at the middle of the lane width of the travel lane 2, based on the current position of the automobile 1 and the information regarding the lane width of the travel lane 2 included in the high-precision map data 17. Thus, the automobile 1 is configured to travel while keeping to the middle of the lane width of the travel lane 2 even when, for example, the travel lane 2 is curved, as with the case where the travel lane 2 is linear. The automobile 1 is configured to travel to keep to the middle of the lane width of the travel lane 2.

In addition, the ALC controller 33 of the embodiment is configured to stop a lane keep control described above and carry out a derail control. The derail control includes traveling from the travel lane 2 toward another lane. Thus, the ALC controller 33 is configured to allow the automobile 1 to travel from the travel lane 2 toward another lane adjacent to the travel lane 2, or allow the automobile 1 to travel from the travel lane 2 toward the branch lane 3 as illustrated in FIG. 1. At this occasion, the ALC controller 33 may carry out the derail control based on the captured image by the vehicle outside camera 26. Moreover, the ALC controller 33 may carry out the derail control to travel from the travel lane 2 toward another lane, to prevent generation of an excessive acceleration rate or moment at the speed of the automobile 1 at a start of the derail control. When determining that the automobile 1 after the derail control has reached the middle of another lane in the vehicle widthwise direction after the movement based on the captured image by the vehicle outside camera 26, the ALC controller 33 ends the derail control and restarts the lane keep control. Thus, the automobile 1 is configured to travel on another lane after the movement as the new travel lane 2, while keeping to the middle of the lane width of the travel lane 2.

Such an ALC controller 33 serves as an automatic lane change device.

The main controller 32 basically predicts the future position and travel environment of the automobile 1 traveling, and generates the travel control value for safe travel under the prediction. Moreover, the main controller 32 outputs the generated travel control value to the steering control device 21, the driving control device 22, and the braking control device 23.

By such a travel lane keeping control by the ALC controller 33 and the travel control on the travel lane 2 by the main controller 32, the automobile 1 is configured to continue traveling on the travel lane 2 while securing a certain level of safety.

Moreover, in the embodiment, the travel control device 11 described above is configured to carry out the lane change control from the travel lane 2 to the branch lane 3.

Thus, the ALC controller 33 performs derail travel to travel from the travel lane 2 toward the branch lane 3. In the automobile 1, the ALC controller 33 serves as the automatic lane change device configured to carry out the lane change control of the automobile 1 from the travel lane 2 to the branch lane 3.

Furthermore, the main controller 32 carries out a prior control and a branch travel control, in addition to a main travel control to continue traveling on the travel lane 2. The prior control is provided for the lane change from the travel lane 2 to the branch lane 3. The branch travel control includes making the lane change from the travel lane 2 to the branch lane 3 by using the ALC controller 33.

Figure 5:
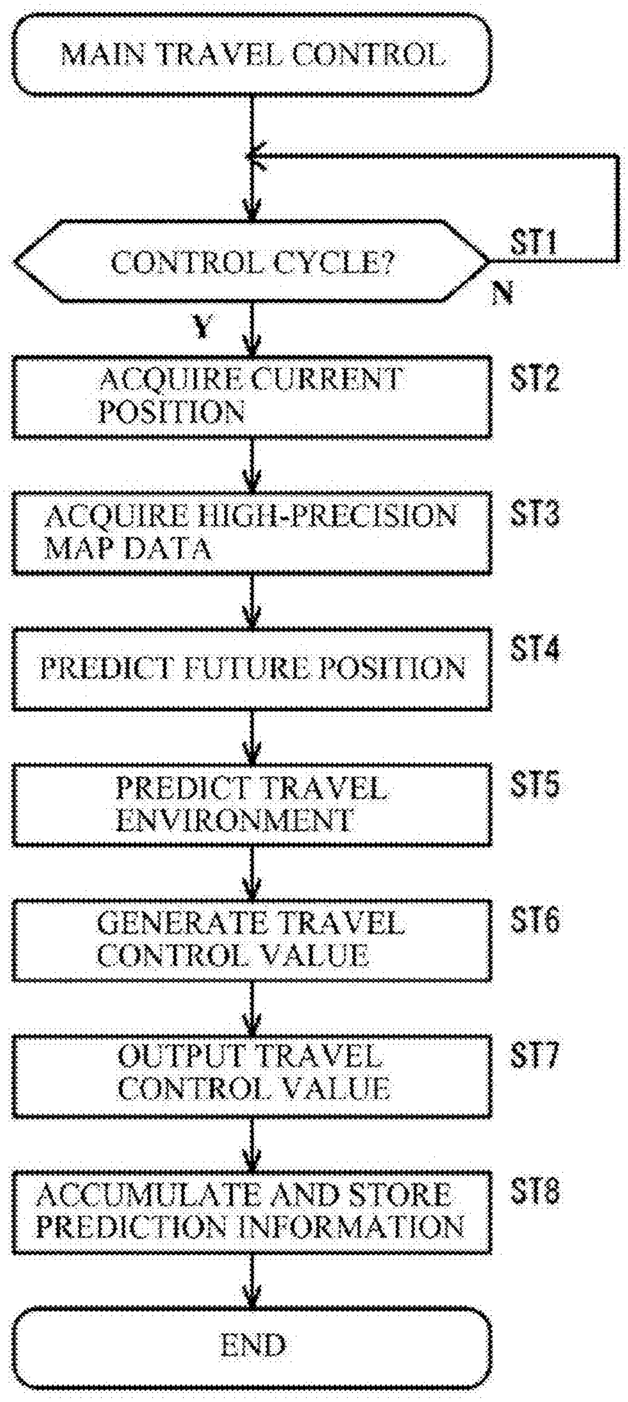
FIG. 5 is a flowchart of a basic main travel control to be carried out steadily and repetitively, by a main controller in FIG. 4, during automated driving travel of the automobile.

FIG. 5 is a flowchart of the basic main travel control to be carried out steadily and repetitively, by the main controller 32 in FIG. 4, during automated driving travel of the automobile 1.

The CPU 12 of the travel control device 11 in FIG. 3, as the main controller 32 in FIG. 4, may carry out the basic main travel control in FIG. 5 steadily and repetitively while traveling, for the automated driving of the automobile 1.

In step ST1, the main controller 32 determines whether or not it is timing of a control cycle for the basic main travel control in FIG. 5. The control cycle for the main travel control in FIG. 5 may be measured by the timer 14. When elapsed time from previous timing measured by the timer 14 is not equal to or more than the control cycle, the main controller 32 repeats this process. When the elapsed time from the previous control timing measured by the timer 14 becomes equal to or more than the control cycle, the main controller 32 causes the flow to proceed to step ST2 to newly carry out the basic main travel control.

In step ST2, the main controller 32 acquires the latest current position of the automobile 1 from the position obtainer 31.

In step ST3, the main controller 32 acquires the high-precision map data 17 from the memory 13. Here, the information to be acquired from the high-precision map data 17 may be, for example, the information regarding the travel lane 2 on which the automobile 1 travels. However, the information to be acquired may include, for example, the information regarding the road including the travel lane 2, as necessary for the control.

In step ST4, the main controller 32 predicts the future position of the automobile 1 on the travel lane 2 by using the information acquired in the processes by step ST3. For example, the main controller 32 predicts the future position on the travel lane 2 after predetermined time in a case where the automobile 1 travels from the current position while maintaining the travel state under the current control. Here, the predetermined time may be a fixed value equal to or more than the control cycle of the main travel control. Alternatively, the predetermined time may be a value that increases or decreases in accordance with the travel speed. Thus, the main controller 32 is configured to predict, for example, the future position by moving for the predetermined time from the current position at the current speed.

In step ST5, the main controller 32 predicts the travel environment of the automobile 1 on the travel lane 2 from the current position to the future position. Here, in addition to the information acquired in steps ST3 and ST4, the main controller 32 may acquire information regarding, for example, travel of other vehicles present on the travel lane 2, and predict the travel environment.

For example, when a segment of the travel lane 2 from the current position to the future position is linear and there are no other vehicles or the like in the segment, the travel environment of the automobile 1 is suitable for traveling linearly while maintaining the current travel. In contrast, when the segment of the travel lane 2 from the current position to the future position is curved, the automobile 1 needs to be steered to travel along the curve of the travel lane 2. Moreover, when another vehicle or the like is stopped because of a failure in the segment, the automobile 1 needs to stop or change its course short of the vehicle having the failure.

In step ST6, the main controller 32 generates the travel control value to perform the travel in accordance with the prediction in steps ST4 and ST5. When steering or a course change is necessary in traveling in the predicted travel environment, the main controller 32 generates the travel control value for the steering. When acceleration is necessary, the main controller 32 generates the travel control value for driving. When deceleration or a stop is necessary, the main controller 32 generates the travel control value for the deceleration.

In step ST7, the main controller 32 outputs the various travel control values generated in step ST6 to the respective control devices as destinations. The main controller 32 outputs, for example, the travel control value for the steering to the steering control device 21. The steering control device 21 controls the direction of the steered wheels provided in the automobile 1 in accordance with the traveling control value for the steering. Moreover, the main controller 32 outputs the travel control value for the driving to the driving control device 22. The driving control device 22 controls the driving force source and the power transmission mechanism provided in the automobile 1 in accordance with the travel control value for the driving. Furthermore, the main controller 32 outputs the travel control value for the braking to the braking control device 23. The braking control device 23 controls the braking device provided in the automobile 1 in accordance with the travel control value for the braking. Thus, the automobile 1 is configured to travel on the travel lane 2 or the road thereof by the automated driving in accordance with the travel control value generated by the main controller 32 based on the prediction.

It is to be noted that the main controller 32 may carry out the processes of steps ST6 and ST7 multiple times during a period of the current control cycle.

In step ST8, the main controller 32 stores the information predicted in the current control cycle in the memory 13. The prediction information 34 may be accumulated and stored in the memory 13. Thereafter, the main controller 32 ends the control.

As described, the main controller 32 is configured to control the travel of the automobile 1 repetitively on every control cycle by using the information regarding the current position of the automobile 1 acquired from the GNSS receiver 25 through the position obtainer 31 and the high-precision map data 17 held in the memory 13.

Moreover, the main controller 32 is configured to carry out, repetitively on every control cycle, predicting the future position of the automobile 1 on the travel lane 2 by using the information regarding the current position of the automobile 1 traveling and the high-precision map data 17 to store the future position in the memory 13, and carrying out the travel control of the automobile 1 in accordance with the travel environment at the predicted future position.

When the basic main travel control in FIG. 5 is carried out multiple times, the prediction information 34 illustrated in FIG. 4 is accumulated multiple times and stored in the memory 13.

Figure 6:
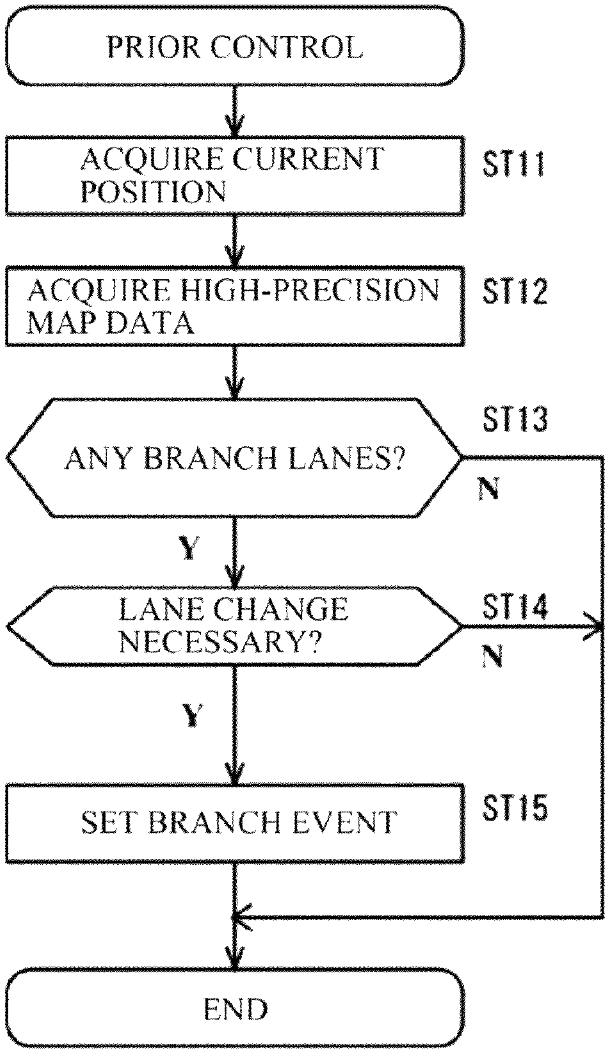
FIG. 6 is a flowchart of a prior control for the lane change control, to be carried out repetitively, by the main controller in FIG. 4, for a lane change by automated driving.

FIG. 6 is a flowchart of the prior control for the lane change control, to be carried out repetitively by the main controller 32 in FIG. 4 for the lane change by the automated driving.

The CPU 12 of the travel control device 11 in FIG. 3, as the main controller 32 in FIG. 4, may carry out the prior control for the lane change control in FIG. 6 steadily and repetitively while traveling, for the automated driving of the automobile 1.

However, the main controller 32 may carry out the prior control in FIG. 6 on longer cycles than the basic main travel control in FIG. 5. That is, the main controller 32 may repetitively carry out the prior control in FIG. 6, for example, on every multiple control cycles of the basic main travel control in FIG. 5. By carrying out the prior control in FIG. 6 on the longer cycles than the basic main travel control in FIG. 5, separately from the basic main travel control in FIG. 5, it is possible, in the embodiment, to reduce an instantaneous process load of the CPU 12 for the control of the automated driving in FIGS. 5 and 6.

In step ST11, the main controller 32 acquires the latest current position of the automobile 1 from the position obtainer 31.

In step ST12, the main controller 32 acquires the high-precision map data 17 from the memory 13.

The information in the high-precision map data 17 to be acquired here may include, for example, not only the information regarding the travel lane 2 on which the automobile 1 travels but also information regarding other lanes of the road including the travel lane 2, and information regarding other roads coupled in the direction of advance of the automobile 1 to the travel lane 2 or the other lanes, and regarding other lanes of the other roads. The main controller 32 may acquire the information regarding the other lanes and roads in a predetermined distance range from the current position of the automobile 1, from the high-precision map data 17 in the memory 13. Here, the information regarding the other lanes and the information regarding the other roads include not only the path information S regarding each lane or road but also the information regarding the branch starting point Ps of each lane or road. The main controller 32 is configured to use a direction of actual movement that couples the multiple current positions of the automobile 1 as the direction of advance of the automobile 1.

In step ST13, the main controller 32 determines presence or absence of other lanes coupled to the travel lane 2 in the direction of advance of the automobile 1, e.g., other lanes such as the branch lane 3 in FIG. 1, based on the information acquired from the high-precision map data 17 in step ST12. Here, information regarding a single-lane road is treated as information regarding a single lane. For example, as illustrated in FIG. 1, when the branch lane 3 is coupled to the travel lane 2 in the predetermined distance range from the current position of the automobile 1, the main controller 32 determines that another lane coupled to the travel lane 2 is present, and causes the flow to proceed to step ST14. In contrast, when no branch lane 3 is coupled to the travel lane 2 in the predetermined distance range from the current position of the automobile 1, the main controller 32 determines that there are no other lanes coupled to the travel lane 2, and ends the control. In this case, because there are no other lanes coupled to the travel lane 2, the automobile 1 continuously travels on the travel lane 2 within the predetermined distance range from the current position of the automobile 1.

In step ST14, the main controller 32 determines whether or not a lane change is necessary with respect to the travel of the subject automobile. For example, when the main controller 32 carries out the control in FIG. 5, the automobile 1 is traveling toward a destination of the automated driving. The destination is set in the automobile 1 by, for example, the driver. In this case, the main controller 32 may determine whether or not the lane change to another lane related to the determination in step ST13 is necessary, based on positional relation in the high-precision map data 17 between, for example, the travel lane 2 and another lane related to the determination in step ST13, and the destination. Moreover, when determining that the lane change to another lane is necessary, the main controller 32 causes the flow to proceed to step ST15. When determining that the lane change to another lane is unnecessary, the main controller 32 ends the control. In this case, the automobile 1 continuously travels on the travel lane 2 in the predetermined distance range from the current position of the automobile 1.

In step ST15, the main controller 32 sets a branch event. The main controller 32 updates the branch event flag 35 held in, for example, the memory 13 from an insignificant value to a significant value. Thereafter, the main controller 32 ends the control.

As described, in the prior control in FIG. 6, the main controller 32 determines whether or not the lane change from the travel lane 2 to the branch lane 3 with respect to the automobile 1 is necessary.

It is to be noted that, when the branch event flag 35 of the significant value is held in the memory 13 by the prior control in FIG. 6, the main controller 32 may carry out a preparation control for the lane change from the travel lane 2 to the branch lane 3, in the basic main travel control in FIG. 5. For example, in step ST5 in FIG. 5, the main controller 32 acquires the value of the branch event flag 35. Moreover, when the branch event flag 35 has the significant value, in step ST6 in FIG. 5, the main controller 32 generates, for example, the travel control value for the steering to make the lane change to change the lane on which the subject automobile travels to the lane to which the branch lane 3 is directly coupled, and outputs the generated travel control value to, for example, the steering control device 21. Thus, the automobile 1 traveling by the automated driving is brought to a state in which the automobile 1 is traveling on the lane to which the branch lane 3 is directly coupled, as the travel lane 2 before reaching the branch lane 3. Here, in the preparation control, the main controller 32 may command the ALC controller 33 to make the lane change, and the ALC controller 33 may generate, for example, the travel control value for the steering for the lane change, and output the travel control value to, for example, the steering control device 21.

Figure 7:
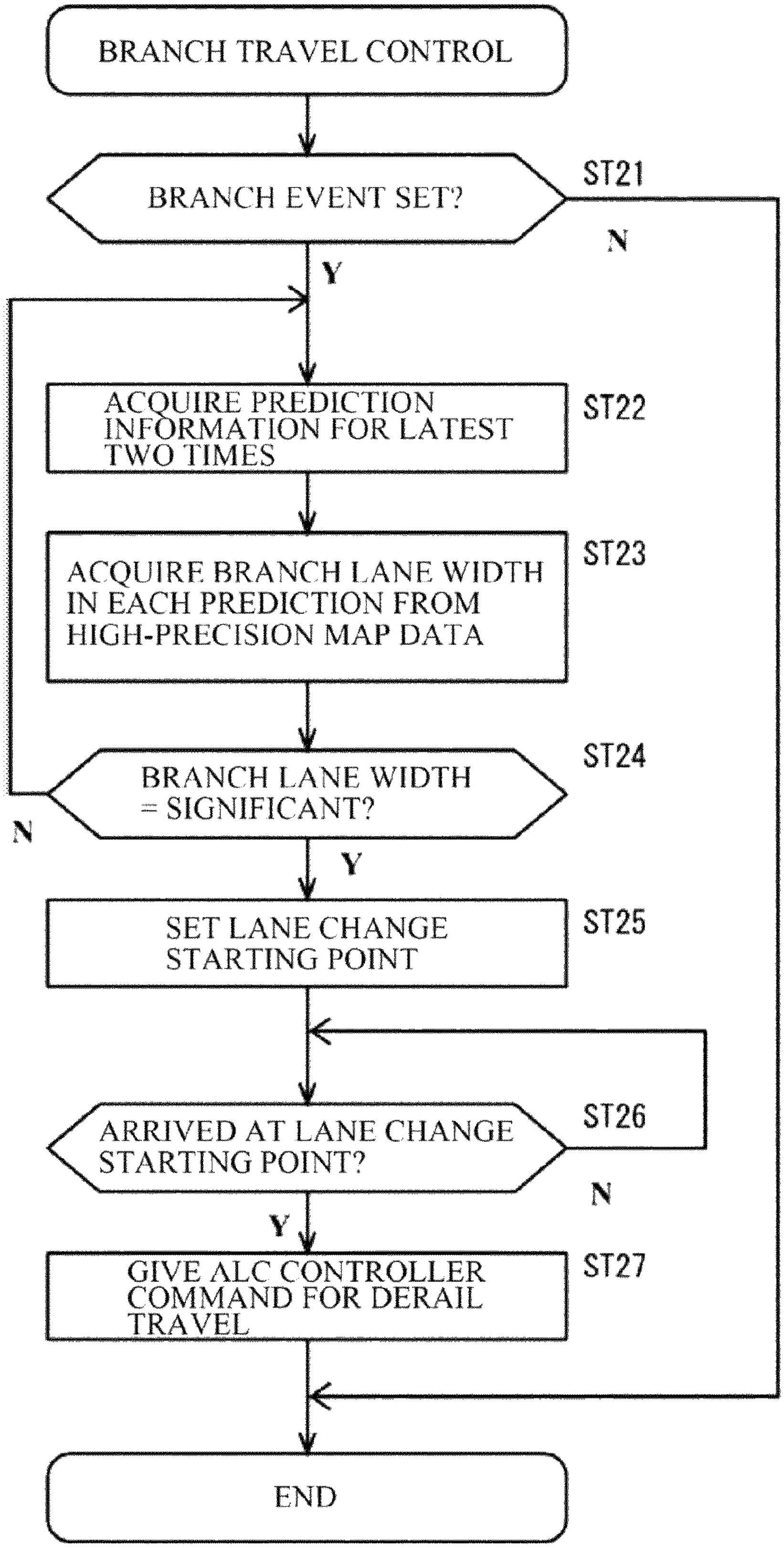
FIG. 7 is a flowchart of a branch travel control to be carried out by the main controller in FIG. 4 to start carrying out the lane change control.

FIG. 7 is a flowchart of the branch travel control to be carried out by the main controller 32 in FIG. 4 to start carrying out the lane change control.

The CPU 12 of the travel control device 11 in FIG. 3, as the main controller 32 in FIG. 4, repetitively carries out the branch travel control in FIG. 7 while the automobile 1 is traveling.

In step ST21, the main controller 32 acquires the branch event flag 35 from the memory 13, and determines whether or not the branch event flag 35 is set to the significant value. Moreover, when the branch event flag 35 acquired has the significant value, the main controller 32 determines that the branch event flag 35 has the significant value, and causes the flow to proceed to step ST22. When the branch event flag 35 acquired has the insignificant value, the main controller 32 determines that the branch event flag 35 does not have the significant value, and ends the control. Thus, the main controller 32 carries out the branch travel control in step ST22 and the subsequent steps, when the branch event flag 35 of the significant value is held in the memory 13.

In step ST22, the main controller 32 acquires the prediction information 34 for the latest two times from the memory 13. The memory 13 accumulates and holds the information predicted on each control cycle, by the process of step ST8 in FIG. 5. It is to be noted that the main controller 32 may acquire the prediction information 34 for the latest three or more times from the memory 13.

Figure 8:
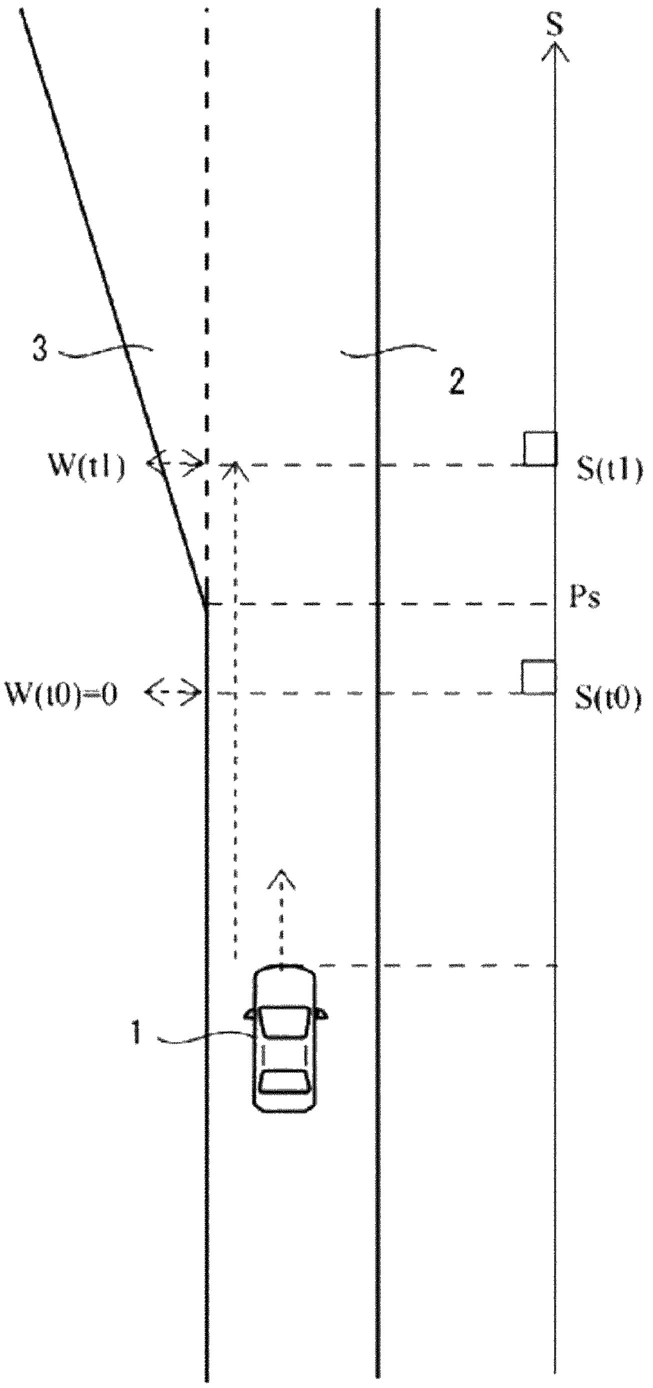
FIG. 8 is an illustrative diagram of travel environment prediction in the main travel control in FIG. 5, when, at the time t1, the automobile in FIG. 1 is short of a segment in which a branch lane is provided.
Figure 9:
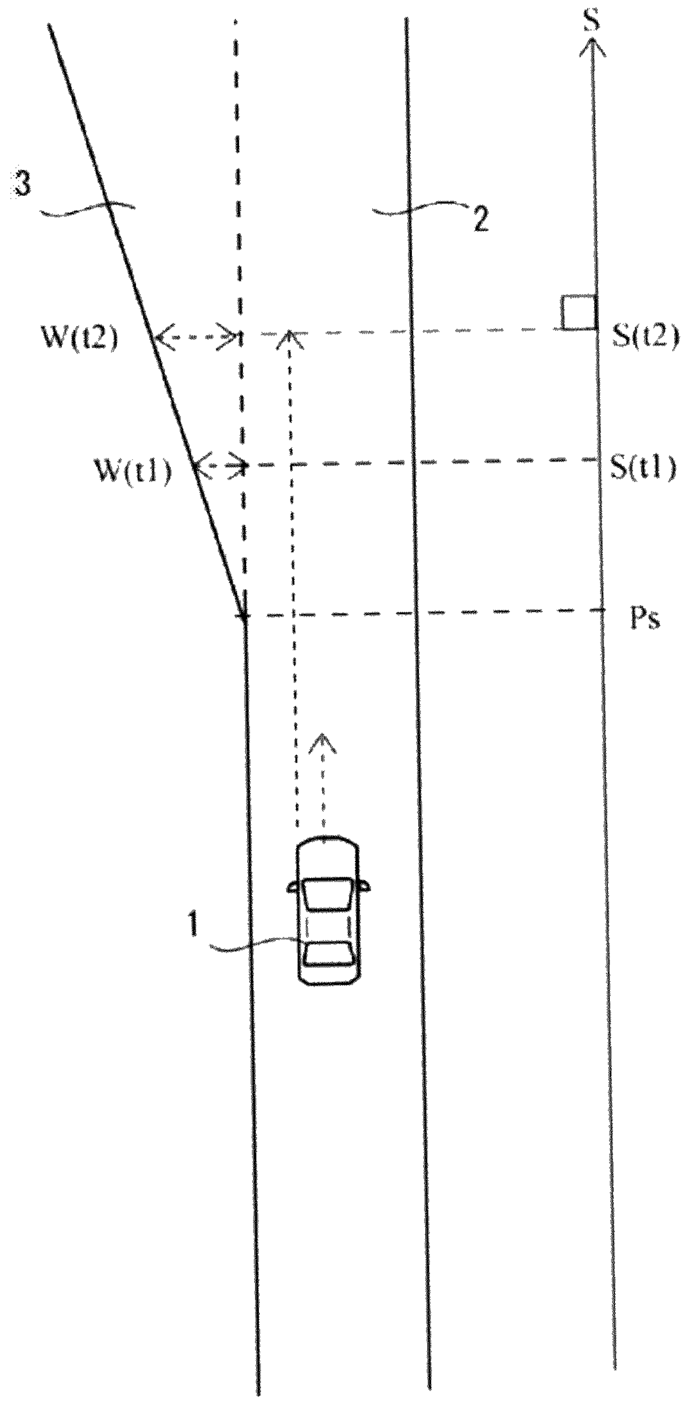
FIG. 9 is an illustrative diagram of the travel environment prediction in the main travel control in FIG. 5, when, at the time t2 later than the time t1, the automobile in FIG. 1 is short of the segment in which the branch lane is provided.

In step ST23, the main controller 32 acquires the lane widths of the branch lanes 3 at each prediction timing from the high-precision map data 17 by using the multiple pieces of the prediction information 34 acquired in step ST22. The high-precision map data 17 holds the information regarding the lane width of the branch lane 3. FIG. 8 illustrates an example of a lane width W(t1) of the branch lane 3 corresponding to a first future position S(t1) predicted at the time t1. FIG. 9 illustrates an example of a lane width W(t2) of the branch lane 3 corresponding to a second future position S(t2) predicted at the time t2. The time t2 is the time later than the time t1. Here, the first future position S(t1) and the second future position S(t2) are not the positions on the path information S regarding the branch lane 3 but the positions on the path information S regarding the travel lane 2. The path information S regarding the travel lane 2 in FIGS. 8 and 9 is linear. Moreover, the main controller 32 may acquire the lane width W(t1) of the branch lane 3 represented by a perpendicular line to the path information S regarding the travel lane 2 at the first future position S(t1), and the lane width W(t2) of the branch lane 3 represented by a perpendicular line to the path information S regarding the travel lane 2 at the second future position S(t2), from the high-precision map data 17.

In step ST24, the main controller 32 determines whether or not the significant one has been acquired, with respect to each of the multiple lane widths at the multiple prediction timings acquired in step ST23.

For example, unlike the first future position S(t1) in FIG. 8 and the second future position S(t2) in FIG. 9, when the future position at certain prediction timing has not reached the branch starting point Ps, it is obvious that the high-precision map data 17 does not include the information regarding the lane width of the branch lane 3 corresponding to it. In such a case, the main controller 32 fails to acquire the significant one as the lane widths at the prediction timings acquired in step ST23. The main controller 32 determines that no significant lane widths have been acquired, and causes the flow to return to step ST22. The main controller 32 repeats the processes of steps ST22 to ST24, until the significant one is successfully acquired with respect to each of the multiple lane widths at the multiple prediction timings acquired in step ST23.

For example, a lane width W(t0) of the branch lane 3 corresponding to a zero-th future position S(t0) in FIG. 8 is "0" indicating that the lane width is insignificant. Accordingly, at the prediction timing in FIG. 8, the main controller 32 causes the flow to return to step ST22. Thus, at the prediction timing in FIG. 9, the main controller 32 causes the flow to proceed to step ST25.

In step ST25, the main controller 32 carries out the processes in FIGS. 8 to 12 described later, by using the multiple pieces of the significant prediction information 34 acquired in step ST22, and sets the lane change starting point or the like on the travel lane 2. The lane change starting point is a reference position for the main controller 32 to command the ALC controller 33 to start the derail control from the travel lane 2 toward the branch lane 3. This makes it possible for the main controller 32 to set the lane change starting point on the travel lane 2 based on the current position of the automobile 1, and the map data and the multiple future positions held in the memory 13. Moreover, in the embodiment, as described later, the main controller 32 sets the lane change starting point corresponding to a gradient of increase in the lane width of the branch lane 3, on the travel lane 2.

In step ST26, the main controller 32 acquires the latest current position of the automobile 1, and determines whether or not the automobile 1 has reached the lane change starting point. When the automobile 1 has not reached the lane change starting point, the main controller 32 repeats this process. When the automobile 1 reaches the lane change starting point, the main controller 32 causes the flow to proceed to step ST27.

In step ST27, the main controller 32 commands the ALC controller 33 to start the derail control from the travel lane 2 toward the branch lane 3. Thus, the ALC controller 33 stops the lane keep control with respect to the travel lane 2, and starts the derail control to travel from the travel lane 2 toward the branch lane 3. The ALC controller 33 carries out the derail control to travel from the travel lane 2 toward the branch lane 3, not to generate an excessive acceleration rate or moment at the speed of the automobile 1 at the timing of the start of the derail control. Moreover, when it is determined that the automobile 1 after the derail control has reached the middle of the branch lane 3 in the vehicle widthwise direction based on the captured image by the vehicle outside camera 26, the ALC controller 33 ends the derail control and restarts the lane keep control. Thus, the automobile 1 is configured to move from the travel lane 2 to the branch lane 3, and travel on the branch lane 3 as the new travel lane 2, while keeping to the middle of the lane width of the travel lane 2.

Thereafter, the main controller 32 ends the control.

As described, the main controller 32 carries out the branch travel control in FIG. 7 when it is determined by the prior control in FIG. 6 that the lane change is necessary. Moreover, in the branch travel control in FIG. 7, the main controller 32 sets the lane change starting point corresponding to the gradient of increase in the lane width of the branch lane 3, on the travel lane 2 of the automobile 1, based on the current position of the automobile 1, and the high-precision map data 17 and the information regarding the multiple future positions held in the memory 13. Furthermore, the main controller 32 commands the ALC controller 33 to start the lane change control based on the arrival of the automobile 1 at the lane change starting point. Thus, in the branch travel control of FIG. 7, the main controller 32 is configured to carry out the lane change control from the travel lane 2 to the branch lane 3 with reference to the lane change starting point.

Next, with reference to FIGS. 8 to 12, the setting process in step ST25 is described in detail.

FIG. 8 is an illustrative diagram of travel environment prediction in the main travel control in FIG. 5 when, at the time t1, the automobile 1 in FIG. 1 is short of the segment in which the branch lane 3 is provided.

FIG. 8 illustrates the travel lane 2 on which the automobile 1 is traveling, the branch lane 3 coupled to the travel lane 2, and the path information S regarding the travel lane 2.

Moreover, the path information S regarding the travel lane 2 indicates the zero-th future position S(t0) of the automobile 1 at the time t0, the first future position S(t1) of the automobile 1 at the time t1, and the branch starting point Ps.

The zero-th lane width W(t0) of the branch lane 3 is illustrated at a foot of a perpendicular broken line at the zero-th future position S(t0) to the path information S regarding the travel lane 2.

The first lane width W(t1) of the branch lane 3 is illustrated at a foot of the perpendicular broken line at the first future position S(t1) to the path information S regarding the travel lane 2.

Here, the zero-th lane width W(t0) is "0" indicating that the branch lane 3 has no width and that the lane width is insignificant, because the zero-th lane width W(t0) is short of the branch starting point Ps, i.e., on the side of the branch starting point Ps on which the automobile 1 is located. In contrast, the first lane width W(t1) has the significant width value because the first lane width W(t1) is located ahead from the branch starting point Ps, i.e., on the opposite side of the branch starting point Ps to the automobile 1.

FIG. 9 is an illustrative diagram of the travel environment prediction in the main travel control in FIG. 5 when, at the time t2 later than the time t1, the automobile 1 in FIG. 1 is short of the segment in which the branch lane 3 is provided.

FIG. 9 illustrates, as with FIG. 8, the travel lane 2 on which the automobile 1 is traveling, the branch lane 3 coupled to the travel lane 2, and the path information S regarding the travel lane 2.

Moreover, the path information S regarding the travel lane 2 indicates the first future position S(t1) of the automobile 1 at the time t1, the second future position S(t2) of the automobile 1 at the time t2, and the branch starting point Ps.

The first lane width W(t1) of the branch lane 3 is illustrated at the foot of the perpendicular broken line at the first future position S(t1) to the path information S regarding the travel lane 2.

The second lane width W(t2) of the branch lane 3 is illustrated at a foot of the perpendicular broken line at the second future position S(t1) to the path information S regarding the travel lane 2.

Here, the first lane width W(t1) and the second lane width W(t2) have the significant width values because the first lane width W(t1) and the second lane width W(t2) are ahead from the branch starting point Ps, i.e., on the opposite side of the branch starting point Ps to the automobile 1.

The main controller 32 accumulates and stores the information illustrated in FIGS. 8 and 9 in the memory 13, as the prediction information 34, by the basic main travel control in FIG. 5. Moreover, at the timing of the time t2 in FIG. 9, by the processes of steps ST22 and ST23 of the branch travel control in FIG. 7, the main controller 32 acquires the latest two pieces of the information, i.e., the information related to the first future position S(t1) and the information related to the second future position S(t2), from among the information related to the zero-th future position S(t0), the information related to the first future position S(t1), and the information related to the second future position S(t2) held in the memory 13.

Figure 10:
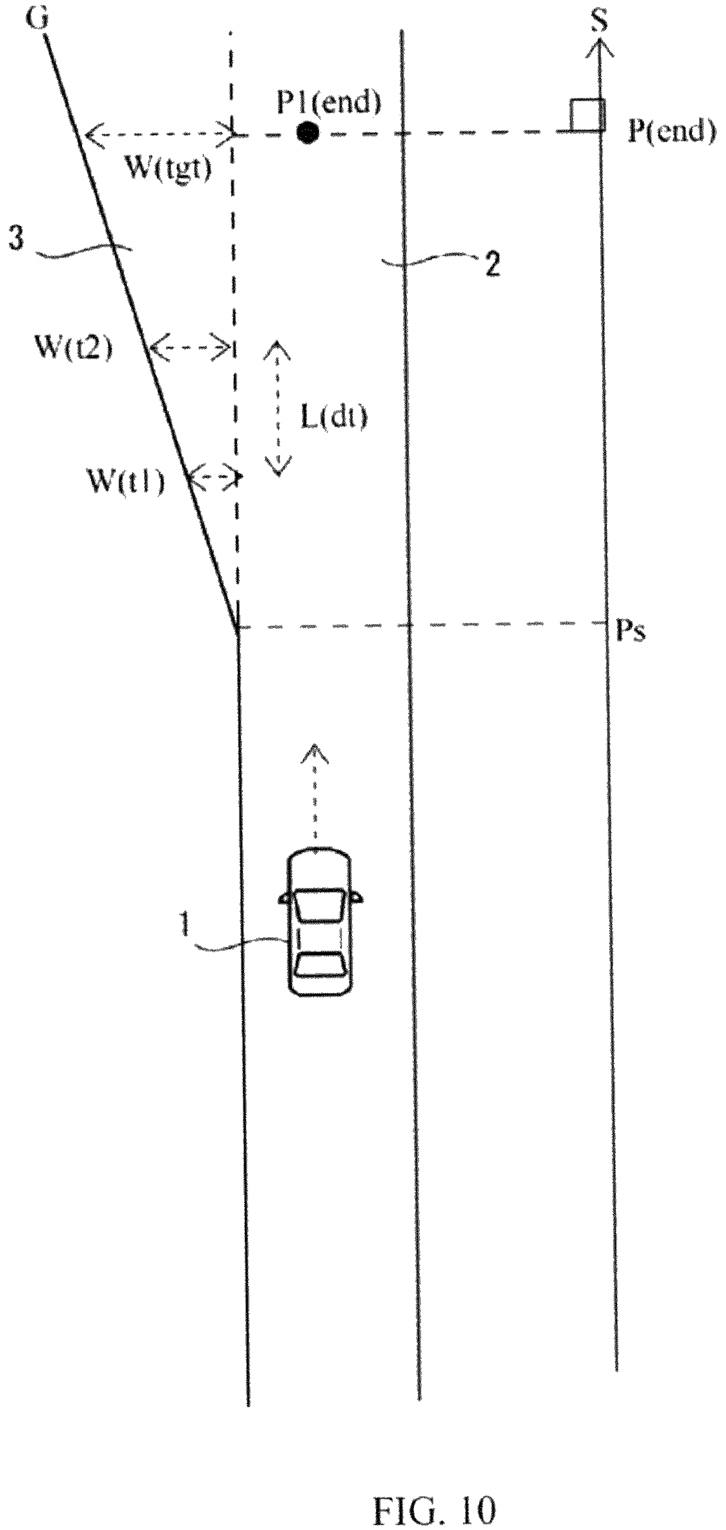
FIG. 10 is an illustrative diagram of a gradient of increase in a lane width of the branch lane, and a lane change end point, to be acquired by calculation by the main controller in FIG. 4, in step ST25 of the branch travel control in FIG. 7.

FIG. 10 is an illustrative diagram of the gradient G of increase in the lane width of the branch lane 3 and a lane change end point P1(end) to be acquired by calculation by the main controller 32 in FIG. 4, in step ST25 of the branch travel control in FIG. 7.

FIG. 10 illustrates, as with FIG. 8, the travel lane 2 on which the automobile 1 is traveling, the branch lane 3 coupled to the travel lane 2, and the path information S regarding the travel lane 2.

Moreover, the first lane width W(t1) and the second lane width W(t2) of the branch lane 3 are separated away from each other by a distance L(dt) to be traveled by the automobile 1 in the control cycle dt in FIG. 5.

In step ST25, first, the main controller 32 calculates the gradient G of increase in the lane width of the branch lane 3 with respect to the path along the travel lane 2, by the following Expression 1. Thus, the main controller 32 acquires by calculation the gradient G of increase in the lane width of the branch lane 3, with respect to the path along the travel lane 2, from multiple pieces of the information regarding the lane width of the branch lane 3 acquired based on multiple pieces of the information regarding the current position.

$$G=(W(t2)-W(t1))/L(dt) \qquad \text{Expression 1}$$

Next, by using the gradient G of increase in the lane width of the branch lane 3, the main controller 32 calculates a point at which the lane width of the branch lane 3 reaches a secured lane width W(tgt) set in advance for the automobile 1. Here, as the secured lane width W(tgt), the width of the automobile 1 may be used. Alternatively, as the secured lane width W(tgt), a width may be used in which a certain margin is secured with respect to the width of the automobile 1.

Moreover, the main controller 32 sets the lane change end point P1(end) of the travel lane 2 corresponding to the calculated point of the branch lane 3, on the travel lane 2. Actually, it suffices for the main controller 32 to set a lane change end point P(end) in the control, on the path information S regarding the travel lane 2. The lane change end point P(end) in the control corresponds to the calculated point of the branch lane 3. The lane change end point P1(end) on the travel lane 2 corresponds to the lane change end point P(end) on the path information S regarding the travel lane 2.

Figure 11:
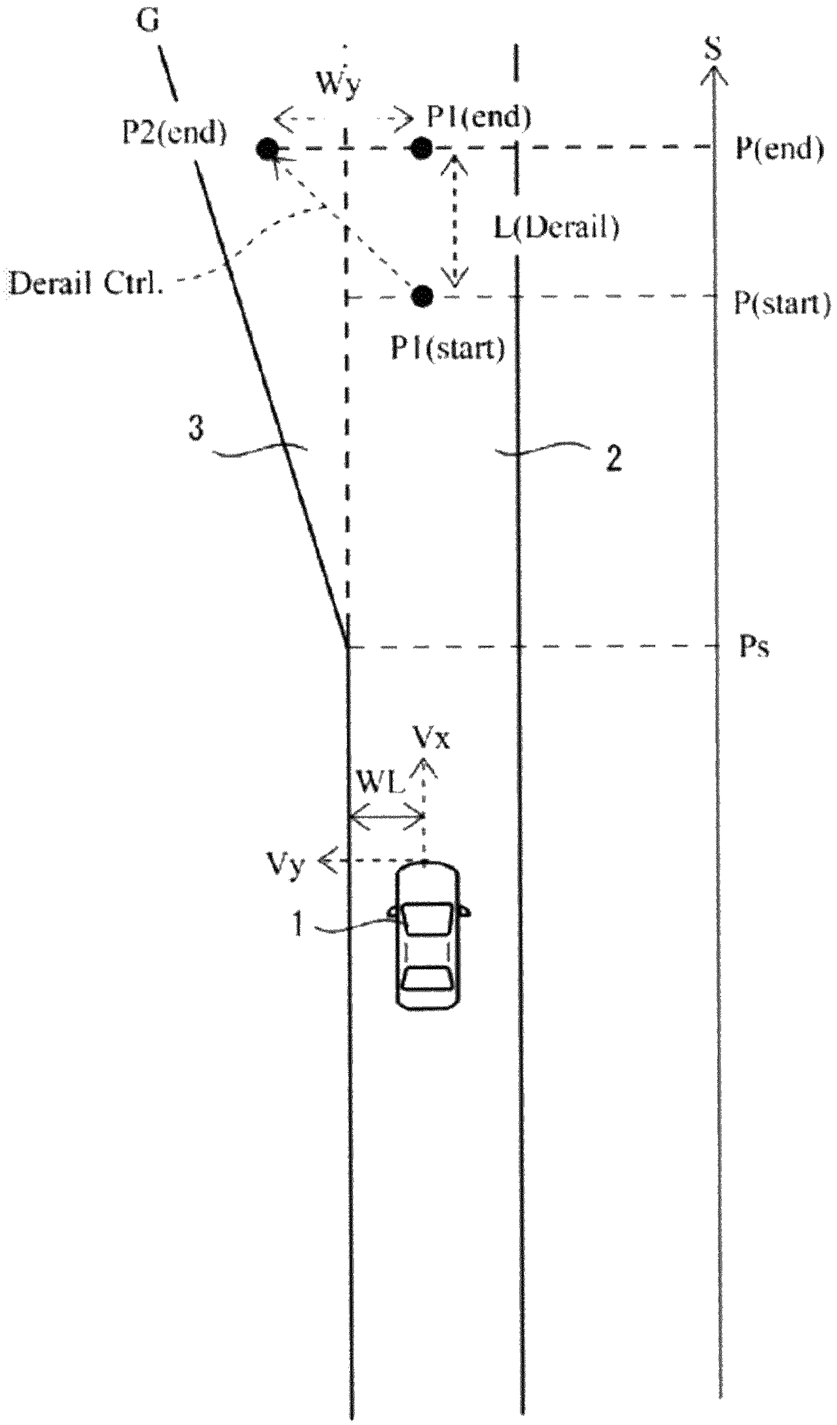
FIG. 11 is an illustrative diagram of a lane change starting point to be acquired by calculation by the main controller in FIG. 4, in step ST25 of the branch travel control in FIG. 7.

FIG. 11 is an illustrative diagram of the lane change starting point P1(start) to be acquired by calculation by the main controller 32 in FIG. 4, in step ST25 of the branch travel control in FIG. 7.

FIG. 11 illustrates, as with FIG. 8, the travel lane 2 on which the automobile 1 is traveling, the branch lane 3 coupled to the travel lane 2, and the path information S regarding the travel lane 2.

Moreover, on the travel lane 2 in FIG. 11, the lane change end point P1(end) is illustrated. Furthermore, the path information S regarding the travel lane 2 indicates the lane change end point P(end) in the control. The lane change end point P(end) in the control corresponds to the lane change end point P1(end). In addition, on the branch lane 3 in FIG. 11, an actual lane change end point P2(end) on the branch lane 3 is illustrated. The actual lane change end point P2(end) corresponds to the lane change end point P1(end) and the lane change end point P1(end).

The main controller 32 calculates a position of the lane change starting point P1(start) on the branch lane 3, to finish the lane change control from the travel lane 2 to the branch lane 3 at the lane change end point P2(end). The ALC controller 33 allows the automobile 1 traveling on the travel lane 2 to travel from the lane change starting point P1(start) toward the lane change end point P2(end) by the lane change control (Derail ctrl). In this lane change control, the automobile 1 moves in a direction of path of the travel lane 2 by a distance of movement L(Derail). Moreover, the automobile 1 moves by a width of movement Wy in a direction perpendicular to the path of the travel lane 2.

Here, a speed component along the path of the travel lane 2 of the automobile 1 is assumed as Vx, and a speed component perpendicular thereto in a lane widthwise direction is assumed as Vy. In this case, the distance of movement L(Derail) is calculatable by the following Expression 2. Here, as the speed component Vx, the speed component Vx of the speed of the automobile in the longitudinal direction of the automobile 1 may be used. As the speed component Vy, the speed component Vx of the speed of the automobile 1 in the vehicle widthwise direction of the automobile 1 may be used.

Moreover, when the automobile 1 is traveling at the middle of the travel lane 2 in the lane widthwise direction, and the lane change end point P2(end) is at the middle of the branch lane 3 in the lane widthwise direction, the width of movement Wy is calculatable by the following Expression 3. Here, it is assumed that the lane width of the travel lane 2 and the lane width of the branch lane 3 at the lane change end point P2(end) are both "WL×2".

Thus, the main controller 32 is configured to calculate the distance of movement L(Derail) during the lane change control, by using lateral movement time (Wy/Vy) and the vehicle speed component Vx along the travel lane 2 of the automobile 1. The lateral movement time (Wy/Vy) is time it takes to finish the lane change control from the travel lane 2 to the branch lane 3 at the timing of the arrival at the lane change end point P1(end) when the automobile 1 continues traveling on the travel lane 2.

$$L(\text{Derail}) = Vx \times (Wy/Vy) \quad \text{Expression 2}$$

$$Wy = WL \times 2 \quad \text{Expression 3}$$

Moreover, as illustrated with respect to the path information S regarding the travel lane 2 in FIG. 11, actually, the main controller 32 sets the lane change starting point P(start) in the control, with respect to the path information S regarding the travel lane 2. The lane change starting point P(start) in the control on the path information S regarding the travel lane 2 corresponds to the lane change starting point P1(start) on the travel lane 2. The lane change starting point PT(start) is short of the lane change end point PT(end) on the travel lane 2 by the distance of movement L(Derail).

Basically, it suffices for the main controller 32 to set the control lane change starting point P(start) in the control obtained by the processes described above, on the path information S regarding the travel lane 2 in step ST25 of the branch travel control in FIG. 7.

However, in step ST26 in FIG. 7, the main controller 32 determines whether or not the automobile 1 has reached the lane change starting point PT(start) on the travel lane 2.

Accordingly, the main controller 32 may provide setting of the information indicating the lane change starting point P1(start), by using information that makes it possible to easily determine the arrival at the lane change starting point P1(start), instead of the lane change starting point P(start) in the control.

Figure 12:
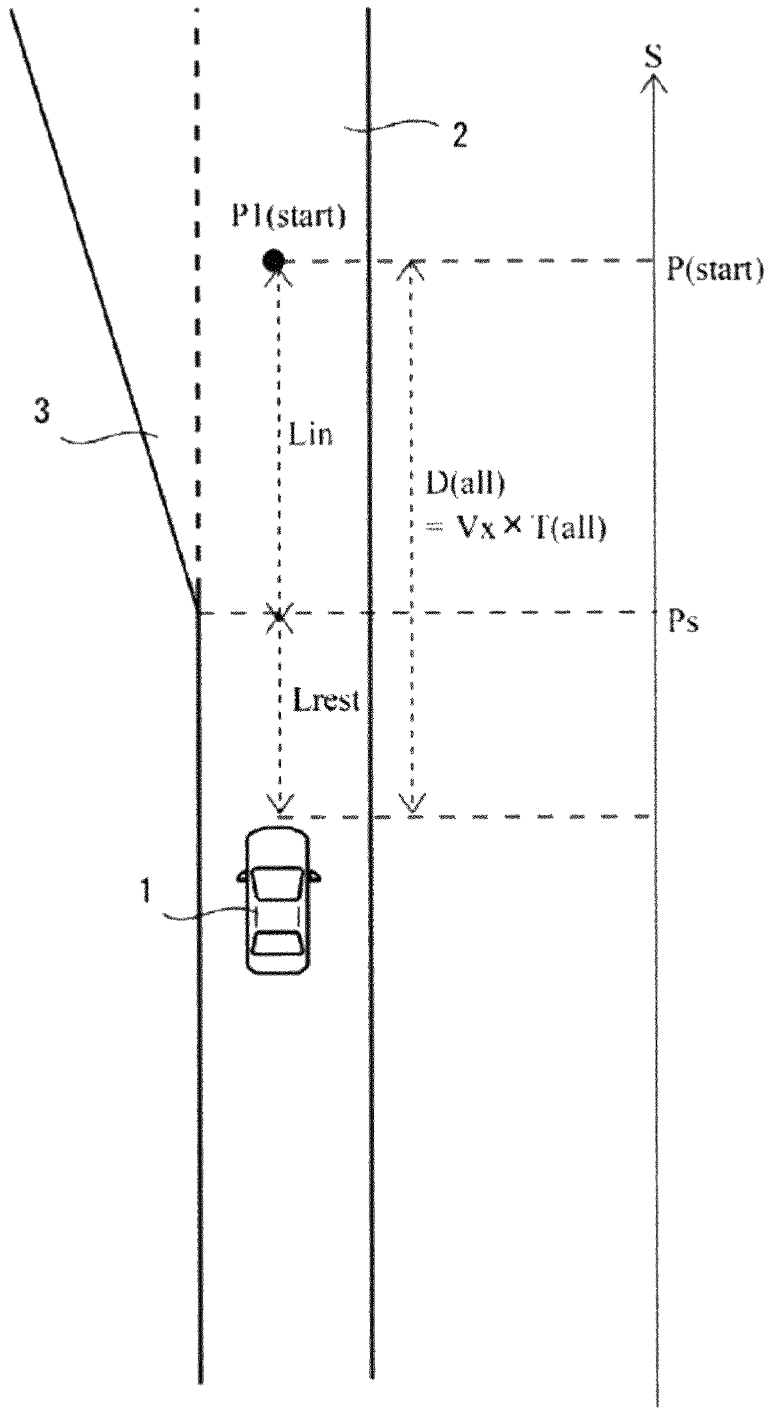
FIG. 12 is an illustrative diagram of a total remaining distance from the automobile to the lane change starting point, and passage time to pass through the total remaining distance, acquirable by calculation by the main controller in FIG. 4, in step ST25 of the branch travel control in FIG. 7.

FIG. 12 is an illustrative diagram of a total remaining distance D(all) from the automobile 1 to the lane change starting point PT(start) and the passage time T(all) to pass through the total remaining distance D(all), acquirable by calculation by the main controller 32 in FIG. 4, in step ST25 of the branch travel control in FIG. 7.

FIG. 12 illustrates, as with FIG. 8, the travel lane 2 on which the automobile 1 is traveling, the branch lane 3 coupled to the travel lane 2, and the path information S regarding the travel lane 2.

Moreover, on the travel lane 2 in FIG. 12, the lane change starting point PT(start) is illustrated. Furthermore, the path information S regarding the travel lane 2 indicates the lane change end point P(start) in the control corresponding to the lane change starting point P1(start).

In FIG. 12, the automobile 1 is located at a point away from the branch starting point Ps by a remaining distance Lrest, on the travel lane 2. Moreover, the lane change starting point P1(start) is away from the branch starting point Ps by an inside-branch distance Lin. In this case, the main controller 32 is configured to calculate the total remaining distance D(all) from the automobile 1 to the lane change starting point P1(start) by the following Expression 4. Furthermore, the main controller 32 is configured to calculate the passage time T(all) to travel to the lane change starting point P1(start) based on the total remaining distance D(all) by the following Expression 5.

$$D(\text{all}) = Lrest + Lin \quad \text{Expression 4}$$

$$T(\text{all}) = D(\text{all})/Vx \quad \text{Expression 5}$$

In step ST25 of the branch travel control in FIG. 7, the main controller 32 may set the total remaining distance D(all) or the passage time T(all) as the information indicating the lane change starting point P1(start).

By the series of calculation processes described above, in step ST25 of the branch travel control in FIG. 7, the main controller 32 of the travel control device 11 provides the setting of the information indicating the lane change starting point PT(start).

That is, the main controller 32 acquires, from the high-precision map data 17, the branch starting point Ps of the branch lane 3 that branches off from the travel lane 2. Moreover, the main controller 32 acquires, by calculation, the total remaining distance D(all) from the automobile 1 to the lane change starting point P1(start), based on the inside-branch distance Lin from the branch starting point Ps to the lane change starting point P1(start) and the remaining distance Lrest from the automobile 1 to the branch starting point Ps. Furthermore, in step ST26 of the branch travel control in FIG. 7, the main controller 32 determines the passing of the lane change starting point P1(start) by using, for example, the total remaining distance D(all) or the passage time T(all). Thus, when the automobile 1 passes the lane change starting point PT(start), the main controller 32 commands the ALC controller 33 to make the lane change control from the travel lane 2 to the branch lane 3. Thus, the ALC controller 33 starts the lane change control (Derail ctrl.).

As described, the main controller 32 is configured to set the lane change starting point PT(start) for the lane change control, on the travel lane 2 of the automobile 1, based on the future position prediction of the automobile 1. The lane change starting point P1(start) corresponds to the degree G in increase in the lane width of the branch lane 3. The future position prediction uses the information regarding the current position and the high-precision map data 17. Furthermore, the main controller 32 is configured to start the lane change control from the travel lane 2 to the branch lane 3 with reference to the lane change starting point P1(start). In each repetition of the travel control of the automobile 1, the main controller 32 refrains from starting the lane change control from the travel lane 2 to the branch lane 3 when the automobile 1 has not finished traveling over the total remaining distance and has not reached the lane change starting point P1(start). Thereafter, when the automobile 1 has finished traveling over the total remaining distance and has reached the lane change starting point P1(start), the main controller 32 is configured to start the lane change control from the travel lane 2 to the branch lane 3.

As described above, in the embodiment, the automobile 1 includes the memory 13, the GNSS receiver 25, and the travel control device 11. The memory 13 holds the high-precision map data 17 including the information regarding the travel lane 2 and the branch lane 3. The GNSS receiver 25 generates the information regarding the current position of the automobile 1. Basically, the travel control device 11 repetitively controls the travel of the automobile 1 by using the information regarding the current position by the GNSS receiver 25 and the high-precision map data 17 in the memory 13. Moreover, the travel control device 11 sets the lane change starting point P1(start) for the lane change control, on the travel lane 2 of the automobile 1, based on the future position prediction of the automobile 1. The lane change starting point P1(start) corresponds to a degree of increase in the lane width of the branch lane 3. The future position prediction uses the information regarding the current position and the map data. Moreover, the travel control device 11 starts the lane change control from the travel lane 2 to the branch lane 3 with reference to the lane change starting point P1(start).

Hence, it is possible for the automobile 1 of the invention to control the travel involving the lane change control from the travel lane 2 to the branch lane 3.

In particular, in the embodiment, the travel control device 11 starts the lane change control from the travel lane 2 to the branch lane 3, not with reference to, for example, the branch starting point Ps of the branch lane 3 that branches off from the travel lane 2, but with reference to the lane change starting point P1(start) corresponding to the degree G of increase in the lane width of the branch lane 3. This inhibits the automobile 1 of the embodiment from traveling to excessively approach the lane edge or the lane borderline on the opposite side of the branch lane 3 to the travel lane 2.

In contrast, for example, if the lane change control is started with reference to the branch starting point Ps of the branch lane 3, as illustrated in FIG. 2, the lane width of the branch lane 3 just ahead from the branch starting point Ps is sometimes small. In this case, there is possibility that the automobile 1 approaches the lane edge or the lane borderline on the opposite side of the branch lane 3 to the travel lane 2. In the embodiment, it is possible to suppress the occurrence of such approach.

Second Embodiment

Next, a second embodiment of the invention is described. In the following, description is given mainly of differences from the forgoing embodiment. Features similar to those of the forgoing embodiment are described using the same reference numerals as those of the forgoing embodiment.

Figure 13:
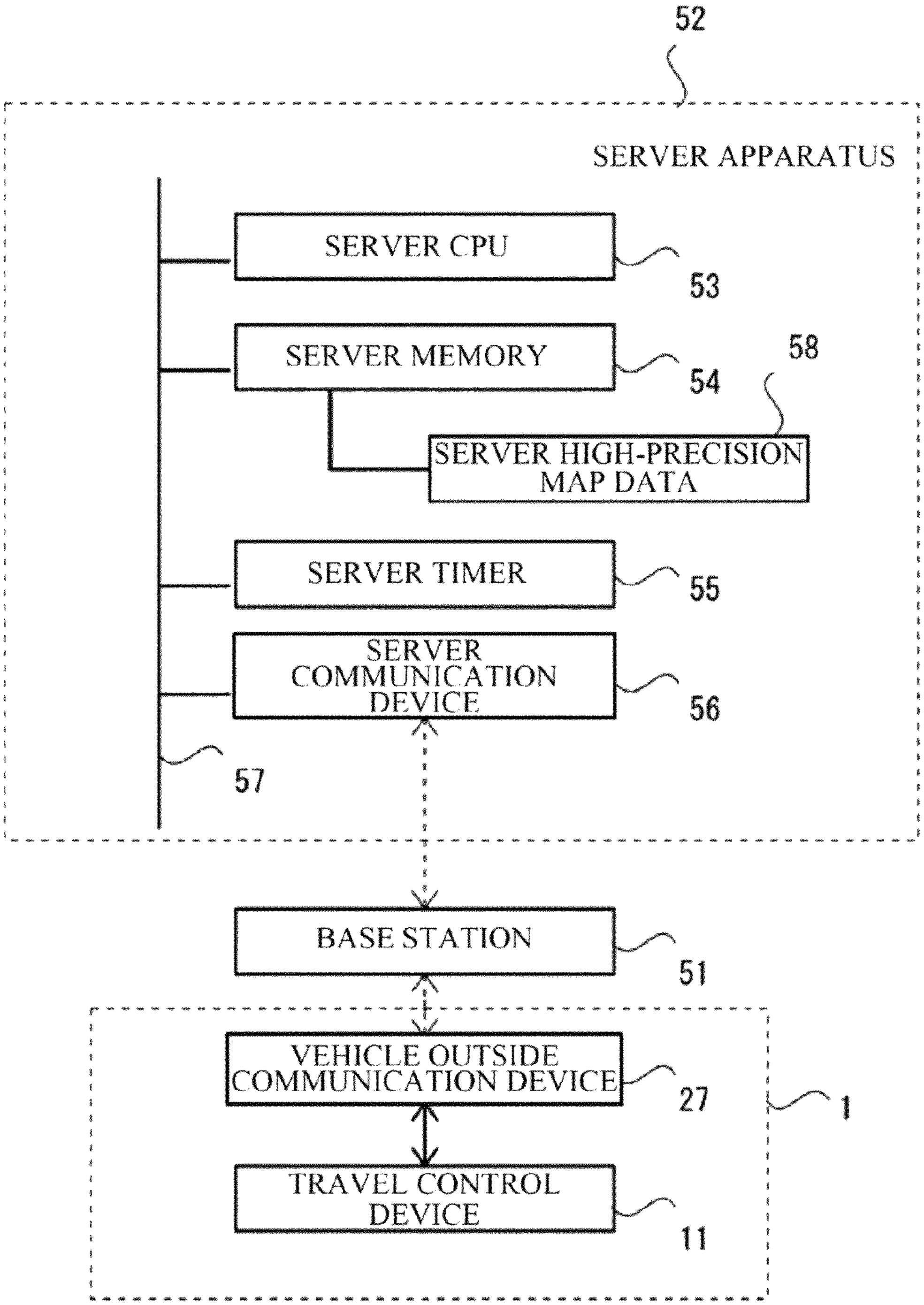
FIG. 13 is an illustrative diagram of a main part of a server apparatus according to a second embodiment of the invention.

FIG. 13 is an illustrative diagram of a main part of the server apparatus 52 according to the second embodiment of the invention.

The server apparatus 52 includes a server CPU 53, a server memory 54, a server timer 55, a server communication device 56, and a server bus 57 to which these are coupled.

As illustrated in FIG. 3, the server communication device 56 transmits and receives information to and from the vehicle outside communication device 27 of the control system 10 of the automobile 1 through the base station 51. The server communication device 56 serves as, for example, a position obtainer device, and receives and acquires the information regarding the current position of the automobile 1 as a control target.

The server timer 55 measures the time or time.

The server memory 54 holds a program to be executed by the server CPU 53 and various kinds of information to be used by the server CPU 53 during the execution of the program. FIG. 13 illustrates server high-precision map data 58 as the information to be held in the server memory 54. The server memory 54 may be, for example, a combination of a volatile memory such as a RAM and a nonvolatile one such as a ROM or an HDD.

The server high-precision map data 58 may be similar to the high-precision map data 17 in the automobile 1 in FIG. 3. Such server high-precision map data 58 includes, for example, the path information S regarding each travel lane and the branch lane 3 on which the automobile 1 can travel, and the lane width information, as information regarding roads on which the automobile 1 travels. Moreover, the server high-precision map data 58 includes the information regarding the branch starting point Ps of the branch lane 3.

The server CPU 53 reads and executes the program held in the server memory 54. Thus, a server controller that controls operation of the server apparatus 52 is realized in the server apparatus 52.

As with the main controller 32 of the forgoing embodiment, such a server controller may carry out the basic main travel control in FIG. 5, the prior control for the lane change control in FIG. 6, and the branch travel control in FIG. 7. It is to be noted that, when allowing the automobile 1 as the control target to carry out the lane change control by a remote control or an operation control, the server controller may carry out at least the prior control for the lane change control in FIG. 6. Moreover, in addition to the prior control in FIG. 6, the server controller may carry out the branch travel control in FIG. 7.

Here, when carrying out the basic main travel control in FIG. 5, in step ST2, the server controller acquires the current position of the automobile 1 as the control target, by using the server communication device 56. In step ST7, the server controller outputs the travel control value to the automobile 1 as the control target, by using the server communication device 56. Moreover, in step ST8, the server controller accumulates and stores the prediction information 34 in the server memory 54.

When carrying out the prior control for the lane change control in FIG. 6, in step ST11, the server controller acquires the current position from the automobile 1 as the control target, by using the server communication device 56. Alternatively, the server controller may acquire the current position of the automobile 1 as the control target from the server memory 54. Moreover, in step ST15, the server controller sets the branch event in the server memory 54.

When carrying out the branch travel control in FIG. 7, in step ST21, the server controller acquires the branch event set in the server memory 54. Moreover, in step ST22, the server controller may acquire the prediction information 34 for the latest two times from the automobile 1 as the control target by using the server communication device 56, or acquire the prediction information 34 for the latest two times from the server memory 54.

Thus, the server CPU 53 of the server apparatus 52, as a server travel control device, is configured to repetitively generate, when necessary, the travel control information such as the command to make a lane deviation control and the travel control value by using the information regarding the current position acquired by the server communication device 56 and the server higher accuracy map data 58 in the server memory 54. The travel control information is available to the automobile 1 as the control target, for the travel control for the lane change. It is possible for the server CPU 53 of the server apparatus 52, as the server travel control device, to transmit the travel control information to the automobile 1.

Moreover, the automobile 1 as the control target is configured to carry out the lane change control from the travel lane 2 to the branch lane 3 under the control of the server apparatus 52, by the main controller 32 controlling the travel of the subject automobile using the travel control information received and acquired from the server apparatus 52.

As described above, in the embodiment, it is possible for the travel control device 11 of the automobile 1 to start and carry out the lane change control from the travel lane 2 to the branch lane 3 with reference to the lane change starting point acquired from the server apparatus 52.

Hence, it is possible for the automobile 1 of the invention to control the travel involving the lane change control from the travel lane 2 to the branch lane 3.

Although the embodiments in the forgoing are examples of preferred embodiments of the invention, the invention is by no means limited thereto. It should be appreciated that modifications and alterations may be made without departing from the scope of the invention.

DESCRIPTION OF REFERENCE NUMERALS

1 Automobile (Vehicle)
2 Travel lane
3 Branch lane
10 Control system
11 Travel control device
12 CPU
13 Memory
14 Timer
15 Input output port
16 Internal bus
17 High-precision map data
21 Steering control device
22 Driving control device
23 Braking control device
24 Vehicle speed sensor
25 GNSS receiver
26 Vehicle outside camera
27 Vehicle outside communication device
31 Position obtainer
32 Main controller
33 ALC controller
34 Prediction information
35 Branch event flag
51 Base station
52 server apparatus
53 Server CPU
54 Server memory
55 Server timer
56 Server communication device
57 Server bus
58 Server high-precision map data
P(end) Lane change end point in the control
P1(end) Lane change end point on the travel lane
P2(end) Lane change end point on the branch lane
P(start) Lane change starting point in the control
P1(start) Lane change starting point on the travel lane
G gradient of increase in the lane width of the branch lane

The invention claimed is:

1. A vehicle configured to perform a lane change control, the vehicle being configured to control travel of the vehicle involving the lane change control from a travel lane to a branch lane, while the vehicle is traveling, the vehicle comprising:
- a memory that holds map data including information regarding the travel lane and the branch lane;
- a position information generator device configured to generate current position information indicating a current position of the vehicle; and
- a travel control device configured to control the travel of the vehicle by using the current position information generated by the position information generator device and the map data in the memory, wherein
- the travel control device is configured to:
  - acquire a gradient indicating an increase amount of a lane width of the branch lane per unit distance of travel on the travel lane, based on future position prediction of the vehicle, the future position prediction using the current position information and the map data;
  - set, on the travel lane and by using the gradient, a reference point corresponding to a position at which the lane width of the branch lane reaches a secured lane width set in advance for the vehicle;
  - set, on the travel lane, a lane change starting point at a position short of the reference point along the travel lane in a traveling direction of the vehicle; and
  - carry out the lane change control from the travel lane to the branch lane with reference to the lane change starting point.

2. The vehicle configured to perform the lane change control according to claim 1, wherein
- the map data includes information regarding a lane width of the travel lane and information regarding the lane width of the branch lane,
- the travel control device is configured to:
  - in each of a plurality of control cycles, predict a future position of the vehicle on the travel lane based on the current position information and the map data, and store prediction information including the predicted future position in the memory;

acquire, from two most recently stored sets of the prediction information corresponding to different control cycles, a first future position and a second future position of the vehicle on the travel lane;

acquire, from the map data, a first lane width of the branch lane corresponding to the first future position and a second lane width of the branch lane corresponding to the second future position; and acquire the gradient based on the first lane width, the second lane width, and a distance of travel on the travel lane between the first future position and the second future position.

3. The vehicle configured to perform the lane change control according to claim 2, wherein the travel control device is configured to;

acquire a distance of movement during the lane change control, by using lateral movement time to finish the lane change control from the travel lane to the branch lane, and a vehicle speed of the vehicle; and set the lane change starting point on the travel lane, such that the lane change starting point is short of the reference point by the distance of movement.

4. The vehicle configured to perform the lane change control according to claim 2, wherein the travel control device is configured to:

acquire, from the map data, a branch starting point of the branch lane that branches off from the travel lane;

acquire a total remaining distance from the vehicle to the lane change starting point, based on an inside-branch distance from the branch starting point to the lane change starting point, and a remaining distance from the vehicle to the branch starting point; and carry out the lane change control from the travel lane to the branch lane with reference to the lane change starting point, by using the total remaining distance or a passage time to pass through the total remaining distance.

5. The vehicle configured to perform the lane change control according to claim 4, wherein the travel control device is configured to repetitively carry out a travel control of the vehicle using the current position information and the map data, and the travel control device is configured to, in each repetition of the travel control, refrain from starting the lane change control from the travel lane to the branch lane when the vehicle has not traveled the total remaining distance and has not reached the lane change starting point, and start the lane change control from the travel lane to the branch lane when the vehicle has traveled the total remaining distance and has reached the lane change starting point.

6. The vehicle configured to perform the lane change control according to claim 5, wherein the travel control device comprises:

a main travel controller configured to repetitively carry out predicting the future position of the vehicle on the travel lane by using the current position information and the map data, to store the future position in the memory, and carrying out the travel control of the vehicle in accordance with a travel environment at the predicted future position;

a prior processor configured to determine whether a lane change from the travel lane to the branch lane is necessary; and a branch travel controller configured to, when the prior processor determines that the lane change is necessary, set the lane change starting point on the travel lane of the vehicle, based on the current position information, the map data, and a plurality of the future positions held in the memory, and carry out the lane change control from the travel lane to the branch lane with reference to the lane change starting point.

7. The vehicle configured to perform the lane change control according to claim 6, wherein the vehicle comprises an automatic lane change device configured to carry out the lane change control of the vehicle from the travel lane to the branch lane, and the branch travel controller is configured to carry out the lane change control from the travel lane to the branch lane by commanding the automatic lane change device to start the lane change control when the vehicle arrives at the lane change starting point.

8. The vehicle configured to perform the lane change control according to claim 3, wherein the travel control device is configured to:

acquire, from the map data, a branch starting point of the branch lane that branches off from the travel lane;

acquire a total remaining distance from the vehicle to the lane change starting point, based on an inside-branch distance from the branch starting point to the lane change starting point, and a remaining distance from the vehicle to the branch starting point; and carry out the lane change control from the travel lane to the branch lane with reference to the lane change starting point, by using the total remaining distance or a passage time to pass through the total remaining distance.

9. The vehicle configured to perform the lane change control according to claim 8, wherein the travel control device is configured to repetitively carry out a travel control of the vehicle using the current position information and the map data, and the travel control device is configured to, in each repetition of the travel control, refrain from starting the lane change control from the travel lane to the branch lane when the vehicle has not traveled the total remaining distance and has not reached the lane change starting point, and start the lane change control from the travel lane to the branch lane when the vehicle has traveled the total remaining distance and has reached the lane change starting point.

10. The vehicle configured to perform the lane change control according to claim 9, wherein the travel control device comprises:

a main travel controller configured to repetitively carry out predicting the future position of the vehicle on the travel lane by using the current position information and the map data, to store the future position in the memory, and carrying out the travel control of the vehicle in accordance with a travel environment at the predicted future position;

a prior processor configured to determine whether a lane change from the travel lane to the branch lane is necessary; and a branch travel controller configured to, when the prior processor determines that the lane change is necessary, set the lane change starting point on the travel lane of the vehicle, based on the current position information, the map data, and a plurality of the future positions held in the memory, and carry out the lane change control from the travel lane to the branch lane with reference to the lane change starting point.

11. The vehicle configured to perform the lane change control according to claim 10, wherein the vehicle comprises an automatic lane change device configured to carry out the lane change control of the vehicle from the travel lane to the branch lane, and the branch travel controller is configured to carry out the lane change control from the travel lane to the branch lane by commanding the automatic lane change device to start the lane change control when the vehicle arrives at the lane change starting point.

12. The vehicle according to claim 2, wherein the first future position and the second future position are positions on path information regarding the travel lane, and the travel control device is configured to acquire the first lane width and the second lane width as widths of the branch lane represented by perpendicular lines to the path information regarding the travel lane at the first future position and the second future position.

13. The vehicle according to claim 2, wherein the travel control device is configured to acquire the gradient by dividing a difference between the second lane width and the first lane width by the distance of travel on the travel lane between the first future position and the second future position.

14. The vehicle according to claim 1, wherein the secured lane width is a width of the vehicle or a width including a margin with respect to the width of the vehicle.

15. A server apparatus configured to generate travel control information and allow a server communication device to transmit the travel control information to a traveling vehicle, the travel control information being available to the vehicle for a travel control, the server apparatus comprising:

a server memory that holds map data including information regarding a travel lane of the vehicle and a branch lane coupled to the travel lane;

a position obtainer device configured to acquire current position information indicating a current position of the vehicle; and a server travel control device configured to generate the travel control information available to the vehicle for the travel control, by using the current position information acquired by the position obtainer device and the map data in the server memory, wherein the server travel control device is configured to, when generating the travel control information for a lane change control from the travel lane to the branch lane while the vehicle is traveling:

acquire a gradient indicating an increase amount of a lane width of the branch lane per unit distance of travel on the travel lane, based on future position prediction of the vehicle, the future position prediction using the current position information and the map data;

set, on the travel lane and by using the gradient, a reference point corresponding to a position at which the lane width of the branch lane reaches a secured lane width set in advance for the vehicle;

set, on the travel lane, a lane change starting point at a position short of the reference point along the travel lane in a traveling direction of the vehicle; and allow the server communication device to transmit, as the travel control information, information regarding the lane change starting point or information that allows the vehicle to carry out the lane change control from the travel lane to the branch lane with reference to the lane change starting point.

16. A vehicle configured to perform a lane change control, the vehicle being configured to control travel of the vehicle involving the lane change control from a travel lane to a branch lane while the vehicle is traveling, the vehicle comprising:

a memory that holds map data including information regarding the travel lane and the branch lane;

a position information generator device including a GNSS receiver configured to generate current position information indicating a current position of the vehicle; and circuitry configured to control the travel of the vehicle by using the current position information generated by the position information generator device and the map data in the memory, wherein the circuitry is configured to:

acquire a gradient indicating an increase amount of a lane width of the branch lane per unit distance of travel on the travel lane, based on future position prediction of the vehicle, the future position prediction using the current position information and the map data;

set, on the travel lane and by using the gradient, a reference point corresponding to a position at which the lane width of the branch lane reaches a secured lane width set in advance for the vehicle, set, on the travel lane, a lane change starting point at a position short of the reference point along the travel lane in a traveling direction of the vehicle; and carry out the lane change control from the travel lane to the branch lane with reference to the lane change starting point.

* * * * *